(12) United States Patent
Tamura et al.

(10) Patent No.: US 10,599,187 B2
(45) Date of Patent: Mar. 24, 2020

(54) ELECTRONIC DEVICE

(71) Applicant: LENOVO (SINGAPORE) PTE. LTD., Singapore (SG)

(72) Inventors: Fumiio Tamura, Kanagawa (JP); Masato Itoh, Kanagawa (JP); Tabito Miyamoto, Kanagawa (JP); Yoshiyuki Shibayama, Kanagawa (JP)

(73) Assignee: LENOVO SINGAPORE PTE LTD, Singapore (SG)

( * ) Notice: Subject to any disclaimer, the term of this patent is extended or adjusted under 35 U.S.C. 154(b) by 0 days.

(21) Appl. No.: 16/437,735

(22) Filed: Jun. 11, 2019

(65) Prior Publication Data

US 2019/0377389 A1     Dec. 12, 2019

(30) Foreign Application Priority Data

Jun. 11, 2018   (JP) .................................. 2018-111032

(51) Int. Cl.
| | |
|---|---|
| *G06F 1/16* | (2006.01) |
| *H01H 13/7065* | (2006.01) |
| *G06F 3/02* | (2006.01) |

(52) U.S. Cl.
CPC ............ *G06F 1/1662* (2013.01); *G06F 1/169* (2013.01); *G06F 3/0213* (2013.01); *H01H 13/7065* (2013.01); *H01H 2221/044* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,625,532 | A * | 4/1997 | Sellers .................. | G06F 1/1616 200/344 |
| 8,842,073 | B2 * | 9/2014 | Gan ....................... | H01H 13/70 345/168 |
| 9,299,513 | B2 * | 3/2016 | Nakamura ............ | G06F 1/1666 |
| 9,934,916 | B2 * | 4/2018 | Tamura ................. | G06F 1/1616 |
| 9,983,633 | B2 * | 5/2018 | Tamura ................. | G06F 1/1662 |
| 10,061,396 | B1 * | 8/2018 | Shibayama ........... | G06F 1/1677 |
| 10,146,266 | B2 * | 12/2018 | Shibayama ........... | G06F 1/1616 |
| 2015/0001059 | A1 * | 1/2015 | Lin ........................ | H01H 13/02 200/5 A |
| 2015/0016039 | A1 * | 1/2015 | Oakley ................. | G06F 1/1662 361/679.12 |

(Continued)

FOREIGN PATENT DOCUMENTS

| | | |
|---|---|---|
| JP | 05-80880 | 4/1993 |
| JP | 2005-292892 | 10/2005 |

(Continued)

*Primary Examiner* — Lisa Lea-Edmonds
(74) *Attorney, Agent, or Firm* — Russell Ng PLLC; Anthony P. Ng

(57) ABSTRACT

A low-cost electronic device capable of storing keycaps within a chassis is disclosed. The electronic device includes a support plate; a set of keycaps supported above the top face of the support plate, the keycaps moving up and down between the operating position and the storage position; and a frame functioning as a driving member that is movable relative to the keycaps in the direction parallel to the top face of the support plate. Each keycap has a pressure-receiving part. The frame has pressing parts that move relative to the keycaps to come in contact with the pressure-receiving parts.

19 Claims, 13 Drawing Sheets

(56) References Cited

U.S. PATENT DOCUMENTS

| | | | | |
|---|---|---|---|---|
| 2016/0055990 A1* | 2/2016 | Krumpelman | ......... | H01H 13/14 |
| | | | | 361/679.09 |
| 2016/0118206 A1* | 4/2016 | Wu | ........................ | H01H 13/83 |
| | | | | 200/5 A |
| 2017/0125185 A1* | 5/2017 | Lin | ........................ | H01H 13/14 |
| 2017/0125186 A1* | 5/2017 | Lin | ........................ | H01H 13/14 |
| 2017/0148589 A1* | 5/2017 | Wang | .................. | H01H 13/7065 |
| 2017/0200571 A1* | 7/2017 | Wang | .................... | H01H 3/125 |
| 2017/0277227 A1* | 9/2017 | Chou | .................... | G06F 1/1662 |
| 2017/0278651 A1* | 9/2017 | Wang | .................... | G06F 1/1662 |
| 2018/0047530 A1* | 2/2018 | Song | .................... | G06F 1/1662 |
| 2018/0101242 A1* | 4/2018 | Chen | .................... | G06F 1/1662 |
| 2018/0358193 A1* | 12/2018 | Chen | .................... | H01H 13/85 |
| 2019/0326081 A1* | 10/2019 | Kurma Raju | ........ | H01H 13/705 |

FOREIGN PATENT DOCUMENTS

| | | |
|---|---|---|
| JP | 2010-531531 | 9/2010 |
| JP | 2014-127155 | 7/2014 |
| JP | 5980374 | 8/2016 |
| JP | 2016-212722 A | 12/2016 |
| JP | 2018-13974 | 1/2018 |

* cited by examiner

ELECTRONIC DEVICE

PRIORITY CLAIM

The present application claims benefit of priority under 35 U.S.C. §§ 120, 365 to the previously filed Japanese Patent Application No. JP2018-111032 with a priority date of Jun. 11, 2018, which is incorporated by reference herein.

TECHNICAL FIELD

The present invention relates to electronic devices in general, and in particular to an electronic device having a keyboard unit.

BACKGROUND

Some electronic devices, such as a laptop PC, include a display chassis connected to a main body chassis in a way that allows them to flip at the position of 360 degrees beyond the position of 180 degree. In such an electronic device, the face having a keyboard may come in a direct contact with a hard surface, such as the surface of a desk. This may damage the keycaps of the keyboard.

Typically, the main body chassis of an electronic device of this type comes with a keyboard unit having a set of keycaps that are elastically supported to be vertically movable. Such a keyboard unit has to have a certain range of keystroke for good operability. To this end, a keyboard unit has to have a certain thickness in order to avoid the interference of the display with the keyboard unit at the top face of the main body chassis when the display chassis is closed relative to the main body chassis. This may be a barrier for a thinner chassis.

Consequently, it would be desirable to provide an improved electronic device capable of storing keycaps within a chassis when the electronic device operates without the keyboard in order to protect the keycaps.

SUMMARY

In accordance with an embodiment of the present disclosure, an electronic device includes a keyboard unit, a support plate having a top face and a bottom face; a set of keycaps supported above the top face of the support plate, the keycaps being configured to move up and down between a first position where the keycaps move up due to a biasing force from an elastic member and a second position where the keycaps move down against the biasing force from the elastic member; and a driving member movable relative to the keycaps in a direction parallel to the top face of the support plate, wherein each keycap has a pressure-receiving part, the driving member has pressing parts that move relative to the keycaps to come in contact with the pressure-receiving parts, and at least one of the pressure-receiving parts and the pressing parts each have an inclined face. When the pressure-receiving parts and the pressing parts move relatively in a direction to come in contact with each other, each pressing part presses the corresponding pressure-receiving part via the inclined face in order to move the keycaps from the first position to the second position.

This configuration includes the keycaps and the driving member that have the pressure-receiving parts and the pressing parts, respectively, and simply moves the keycaps and the driving member relatively to keep the keycaps at the second position pressed down from the first position when the keycaps are not used. This eliminates the necessity for additional components to press down the keycaps, and the keycaps can be stored within the chassis at a low cost.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
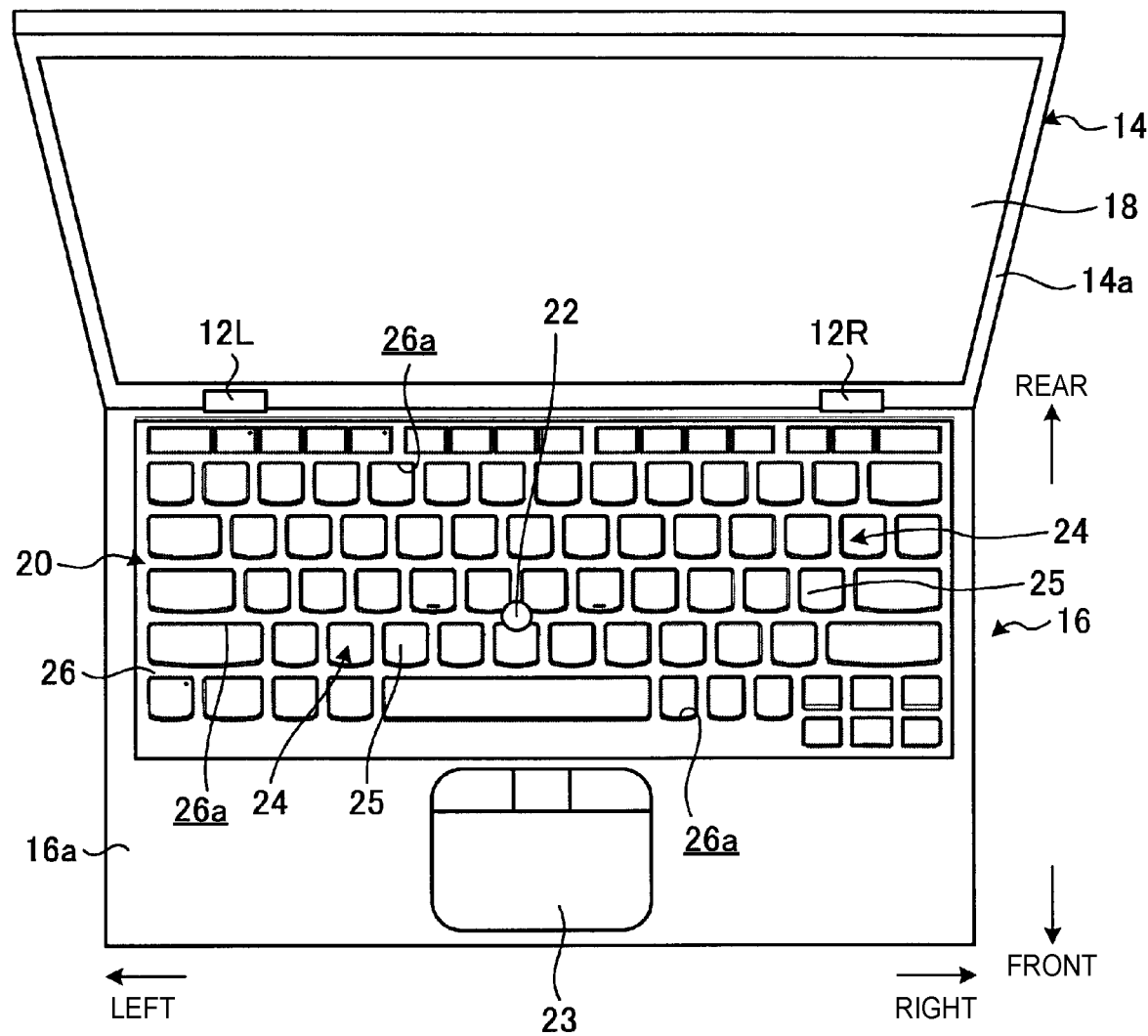
FIG. 1 is a plan view of an electronic device according to a first embodiment.
Figure 2A:
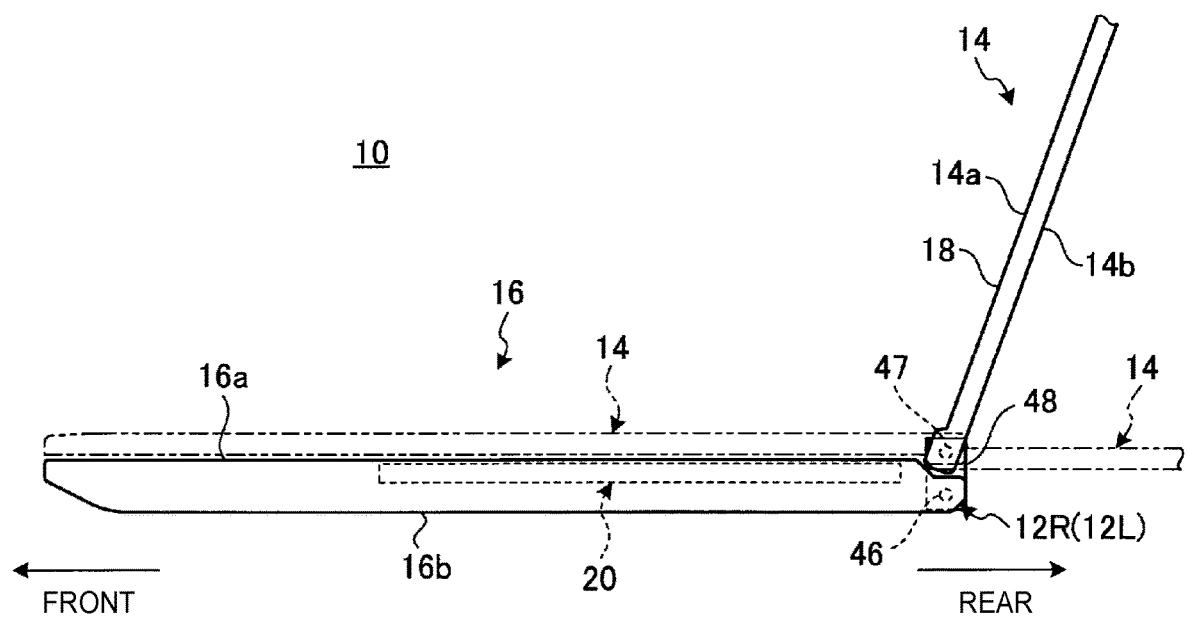
FIG. 2A is a side view of the electronic device shown in FIG. 1.
Figure 2B:
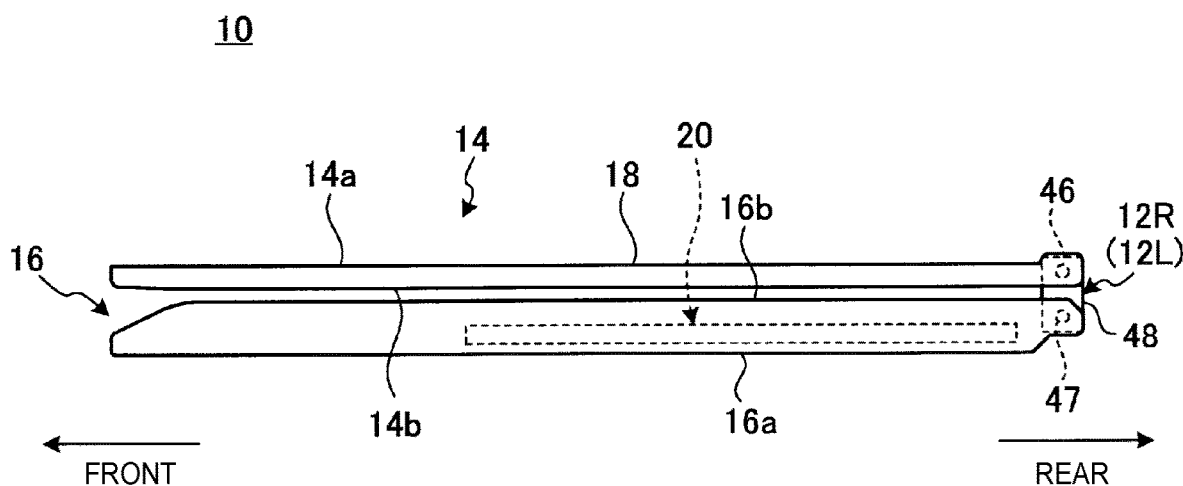
FIG. 2B is a side view of the electronic device in the operating mode as a tablet PC, in which the display chassis rotates in the opening direction from the state of FIG. 2A to have the 360-degree position.

FIG. 1 is a plan view of an electronic device 10, according to a first embodiment of the present disclosure. FIG. 1 shows the electronic device 10 viewed from the above in the operating mode as a laptop PC, in which a display chassis 14 is open relative to a main body chassis 16 via hinge mechanisms 12L, 12R. FIG. 2A is a side view of the electronic device 10 shown in FIG. 1. FIG. 2B is a side view of the electronic device in the operating mode as a tablet PC, in which the display chassis 14 rotates in the opening direction from the state of FIG. 2A to have the 360-degree position.

The electronic device 10 according to the present embodiment is a convertible type PC that is operable as a laptop PC and a tablet PC. When the display chassis 14 rotates at about the angle of 90 degrees to 180 degrees relative to the main body chassis 16, the electronic device 10 is in the laptop mode that can be favorably used as a laptop PC (see FIG. 1 and FIG. 2A). When the display chassis 14 rotates at the 360-degree position relative to the main body chassis 16, the electronic device 10 is in the tablet mode that can be favorably used as a tablet PC (see FIG. 2B). The electronic device 10 may be a typical laptop PC that the display chassis 14 is rotatable in the angular range of 0 degree to about 180 degrees relative to the main body chassis 16. The electronic device 10 may be of various types of electronic devices other than such a convertible type PC and a laptop PC, including a mobile phone, a smart phone, and an electronic organizer.

In the following description, based on the laptop mode shown in FIG. 1 and FIG. 2A, the direction toward a user using the keyboard unit 20 while viewing a display 18 is front, the direction away from the user is rear, the thickness direction of the main body chassis 16 is up and down, and the width direction is left and right.

Angular positions of the display chassis 14 relative to the main body chassis 16 are as follows. When the display chassis 14 is completely closed relative to the main body chassis 16 so that their front face 14a and top face 16a, i.e., the display 18 and the keyboard unit 20 face each other, this position is the 0-degree position (see the position of the display chassis 14 shown with the dashed-two dotted line on the main body chassis 16 in FIG. 2A). With reference to this 0-degree position, the angular positions of the display chassis 14 are described as follows while rotating the display chassis 14 in the opening direction. For instance, when the front face 14a of the display chassis 14 and the top face 16a of the main body chassis 16 are orthogonal to each other, the angular position is a 90-degree position. When the front face 14a and the top face 16a are directed in the same direction (upward) and are parallel to each other (see the position of the display chassis 14 shown with the dashed-two dotted line on the right of the main body chassis 16 in FIG. 2A), the angular position is a 180-degree position. When the rear faces 14b and 16b of the display chassis 14 and the body chassis 16 face each other, the angular position is a 360-degree position (see FIG. 2B). These 0-degree position, 180-degree position, 360-degree position and the like may include angular positions shifted from their accurate angular positions indicated with the numerical angles to some extent due to the configurations of the main body chassis 16, the display chassis 14, or the hinge mechanisms 12L, 12R.

As shown in FIG. 1, FIG. 2A and FIG. 2B, the display chassis 14 and the main body chassis 16 of the electronic device 10 are connected via the left and right hinge mechanisms 12L and 12R as a pair (hereinafter they may be called hinge mechanism 12 collectively) so as to be rotatable from the 0-degree position to the 360-degree position.

The display chassis 14 is electrically connected to the main body chassis 16 via a cable (not illustrated) passing through the hinge mechanism 12. The display 18 includes a touch-panel type liquid crystal display, for example.

The main body chassis 16 has a flat box shape, and includes the hinge mechanism 12 at the rear edge. The main body chassis 16 accommodates various types of electronic components not illustrated, such as a board, an arithmetic unit and a memory. The keyboard unit 20 is disposed at the top face 16a of the main body chassis 16. The keyboard unit 20 includes a pointing stick (manipulating member) 22 at a substantially center part. The pointing stick 22 is a manipulating member to manipulate a cursor (mouse pointer) displayed on the display 18, and a user can manipulate the pointing stick as an alternative of a mouse. The keyboard unit 20 includes a touch pad 23 at a front part. The touch pad 23 is to manipulate a cursor (mouse pointer) displayed on the display 18. The keyboard unit 20 includes three functional buttons on the rear of the touchpad 23, and these functional buttons operate in association with the manipulation of the cursor with the pointing stick 22 or the touch pad 23.

The keyboard unit 20 includes a set of key switches 24 arranged in the front/rear and left/right directions. Each key switch 24 has a keycap 25 as the manipulating surface, and a frame (driving member) 26 fills the gap between the keycaps. The keyboard unit 20 has an isolation structure, that is, neighboring keycaps 25 are separated by the frame 26 and so each keycap is independent.

The frame 26 is a netlike plate having a set of key insertion holes 26a (see FIG. 3A as well) to receive the keycaps 25. The frame 26 of the present embodiment is integrally formed with a cover member that defines the top face 16a of the main body chassis 16, and the frame 26 is made of a metal material, such as magnesium, or a resin material. The frame 26 may be formed separately from the main body chassis 16, and may be fixed to the main body chassis 16.

The main body chassis 16 includes a key-position setting mechanism 28. The key-position setting mechanism 28 is to move the keycaps 25 from an operating-position (first position) for the normal operation to a storage position (second position) that is pressed downward at least at the 0-degree position and the 360-degree position, and to hold the keycaps at the second position (see FIG. 3A and FIG. 3B). This allows the electronic device 10 to be thin at the 0-degree position and the 360-degree position so that the keycaps 25 do not protrude from the top face 16a of the main body chassis 16. The up-and-down motion of the keycaps 25 by the key-position setting mechanism 28 interlocks with the rotation of the display chassis 14 via the hinge mechanism 12.

Figure 3A:
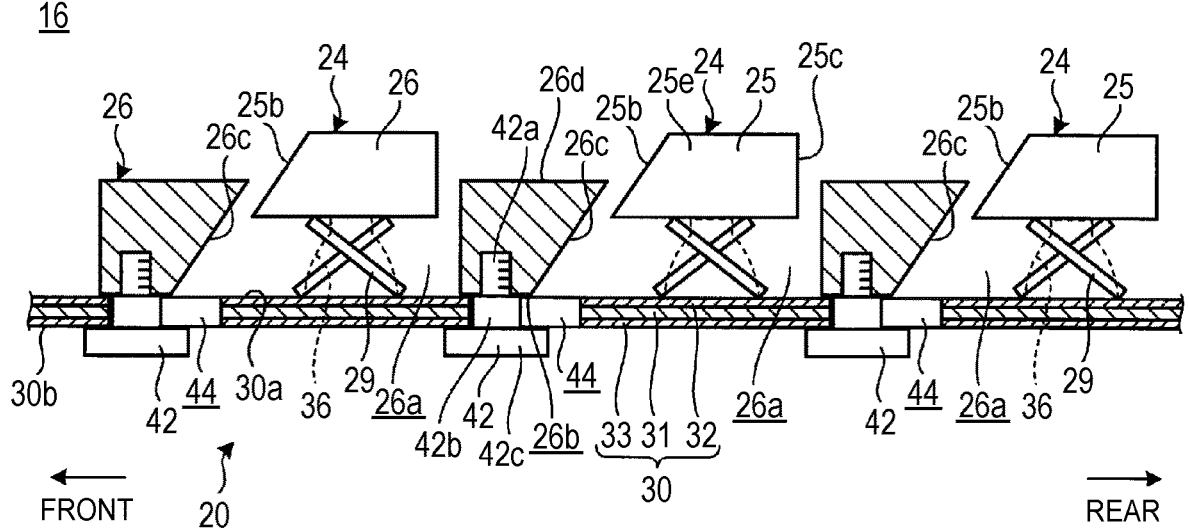
FIG. 3A is a cross-sectional view showing the positional relationship between the keyboard unit and the frame when the keycaps are at the operating position.
Figure 3B:
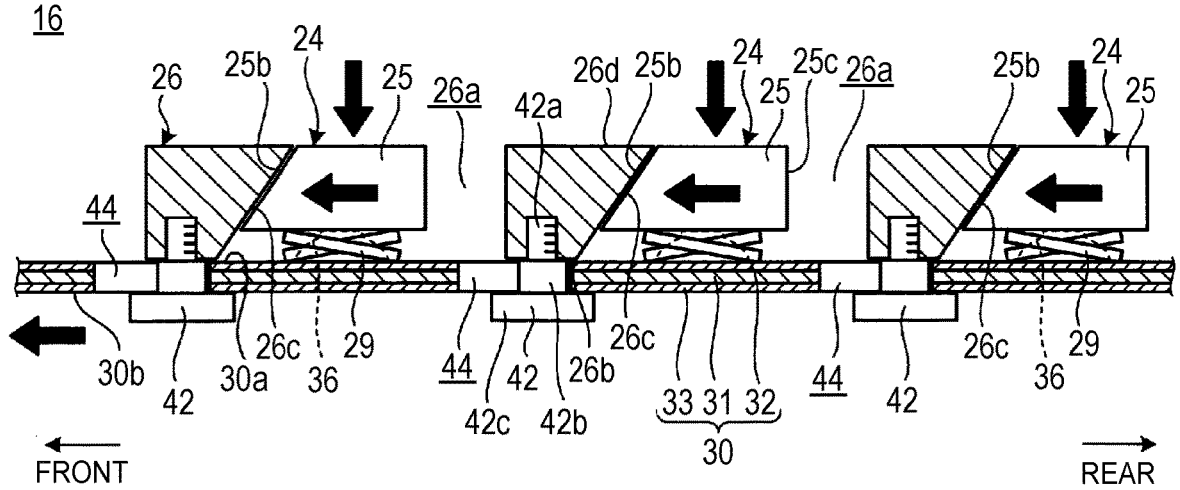
FIG. 3B is a cross-sectional view showing the positional relationship between the keyboard unit and the frame when the key-position setting mechanism moves the keycaps from the position of FIG. 3A to the storage position.

FIG. 3A is a cross-sectional view showing the positional relationship between the keyboard unit 20 and the frame 26 when the keycaps 25 are at the operating position. FIG. 3B is a schematic cross-sectional view showing the positional relationship between the keyboard unit 20 and the frame 26 when the key-position setting mechanism 28 moves the keycaps 25 of FIG. 3A to the storage position.

As shown in FIG. 3A and FIG. 3B, the keyboard unit 20 includes the set of key switches 24 each having a keycap 25 supported movably up and down by a guide mechanism 29, and a support plate 30 to support the key switches 24 above the top face 30a. The support plate 30 has a three-layer structure including a base plate 31, a membrane sheet 32 stacked on the top face of the base plate 31, and a backlight sheet 33 stacked on the bottom face of the base plate 31.

The base plate 31 is formed by cutting and raising or punching a thin metal plate made of aluminum or the like. The base plate 31 is to mount the key switches 24. All of the key switches 24 share one base plate 31. The membrane sheet 32 is a three-layered switch sheet to close a contact when the membrane sheet is pressed, for example. The membrane sheet 32 includes a fixed contact and a movable contact at an overlapped position. When the membrane sheet 32 is pressed at the overlapped position so that the movable contact comes in close contact with the fixed contact, these contacts are closed. Instead of such a three-layer structure, the membrane sheet 32 may include a contact switch that is a rubber conductive part for short-circuit. The membrane sheet 32 has a lot of through holes, and the guide mechanism 29 lands on the top face of the base plate 31 through the through holes. The membrane sheet 32 may be stacked on the bottom face of the base plate 31. The backlight sheet 33 guides and reflects light emitted from a light source, such as a LED, so as to irradiate the keycaps 25 from the below. The backlight sheet 33 may be omitted, and a waterproof sheet may be disposed instead of the backlight sheet.

The keycaps 25 are each disposed above the support plate 30 via the guide mechanism 29 and a rubber dome (elastic member) 36 so as to be movable up and down. The keycaps 25 are formed by molding of resin, for example, to have a substantially square shape in plan view. Each keycap 25 has an top face 25a as a manipulation face, and four outer lateral faces 25b, 25c, 25d, and 25e extending downward from the four edges of the top face 25a.

The guide mechanism 29 supports the corresponding keycap 25 to be movable up and down. The guide mechanism is attached foldably between the base plate 31 and the keycap 25. The guide mechanism 29 has a pantograph structure, for example, having two frames that are assembled like a brace. Each rubber dome 36 is an elastic member to press the membrane sheet 32 when the keycap 25 is pressed down, and to return the keycap 25 to the original position when the pressing force of the keycap 25 is released. The rubber dome 36 is disposed between the membrane sheet 32 and the keycap 25. The rubber dome 36 is made of an elastic material having flexibility, such as silicon rubber. The keycap 25 is elastically supported by the rubber dome 36 while being guided by the guide mechanism 29 to be movable up and down.

When the keycap 25 of the key switch 24 is pressed down, the rubber dome 36 is elastically deformed by the pressing force so as to press the membrane sheet 32. The membrane sheet 32 then closes the contacts. When the pressing force of the keycap 25 is released, the keycap 25 returns to the original position (operating position) by the elastic restoring force of the rubber dome 36, so that the membrane sheet 32 opens the contacts.

Figure 4:
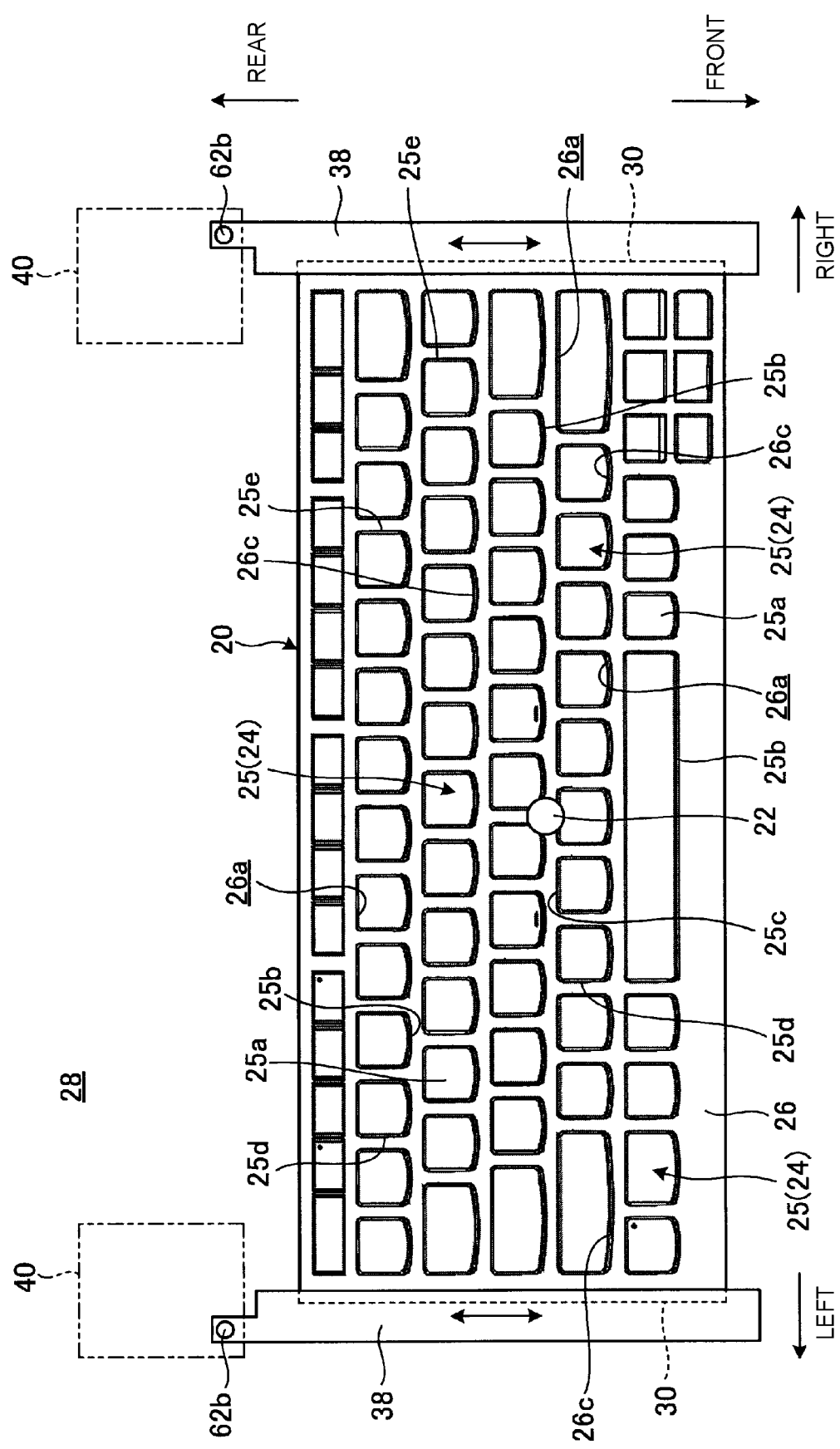
FIG. 4 is a plan view showing the key-position setting mechanism.

The following describes an example of the configuration of the key-position setting mechanism 28 to press down the keycaps 25 to the storage position and hold the keycaps 25 at the position. FIG. 4 is a plan view schematically showing the configuration of the key-position setting mechanism 28.

As shown in FIG. 3A, FIG. 3B and FIG. 4, the key-position setting mechanism 28 includes the keycaps 25, the frame 26, a front/rear slider 38, and a link mechanism 40.

As shown in FIG. 3A and FIG. 3B, the front outer lateral face 25b of each keycap 25 is a forward descending inclined face that is inclined gradually downward from the rear to the front. Hereinafter this front outer lateral face 25b may be called a pressure-receiving part 25b.

The frame 26 is movably disposed on the top face 30a of the support plate 30. The frame 26 connects to the support plate 30 via shoulder screws 42. The keyboard unit 20 has a set of guide slots 44 that penetrate through the support plate 30 in the thickness direction and extend in the front-rear direction. Each of the shoulder screws 42 has a thread part 42a that passes through the guide slot 44 and is screwed with the bottom face 26b of the frame 26. A shoulder 42b of the shoulder screw 42 then abuts on the bottom face 26b of the frame 26 and is movable in the guide slot 44. This supports the support plate 30 to be immovable vertically between a head 42c of the shoulder screw 42 and the bottom face 26b of the frame 26 and to be movable along the guide slot 44. That is, the support plate 30 and each key switch 24 supported by the support plate 30 connect so as to be movable in the front-rear direction along the guide slot 44 relative to the frame 26 (main body chassis 16).

Each key insertion hole 26a of the frame 26 has a pressing part 26c at the front inner wall of the four inner walls that is opposed to the pressure-receiving part 25b of the keycap 25. This pressing part 26c is a rearward ascending inclined face that is inclined gradually upward from the front to the rear, and is opposed to the corresponding pressure-receiving part 25b to be slidable. When the keycaps 25 are at the operating position, each of the pressing parts 26c is at the position where the rear end of the pressing part substantially covers and hides the front end of the corresponding pressure-receiving part 25b from the above (see FIG. 3A). This hides the gap between the pressure-receiving part 25b and the corresponding pressing part 26c in a plan view of the keyboard unit 20. When the keycaps 25 are at the storage position, the rear end of each pressing parts 26c is close to the rear end of the corresponding pressure-receiving part 25b, so that the top face 25a of the keycap 25 is substantially flush with the top face 26d of the frame 26.

The front/rear sliders 38 are a long rectangular plate, and are disposed slidably in the front-rear direction relative to the main body chassis 16. The font/rear sliders 38 are disposed as a pair on the left and the right of the keyboard unit 20, and connect to the lateral ends of the support plate 30, more specifically, to the lateral ends of the base plate 31. The front/rear sliders 38 receive a driving force from the link mechanism 40 to slide in the front-rear direction, so as to move the keyboard unit 20, i.e., the support plate 30 and the key switched 24 supported on the support plate 30, in the front-rear direction.

The link mechanism 40 implements the interlocking between the rotation of the display chassis 14 via the hinge mechanism 12 and the movement of the front/rear slider 38. Before the description of this link mechanism 40, the following describes an example of the configuration of the hinge mechanism 12.

Figure 5:
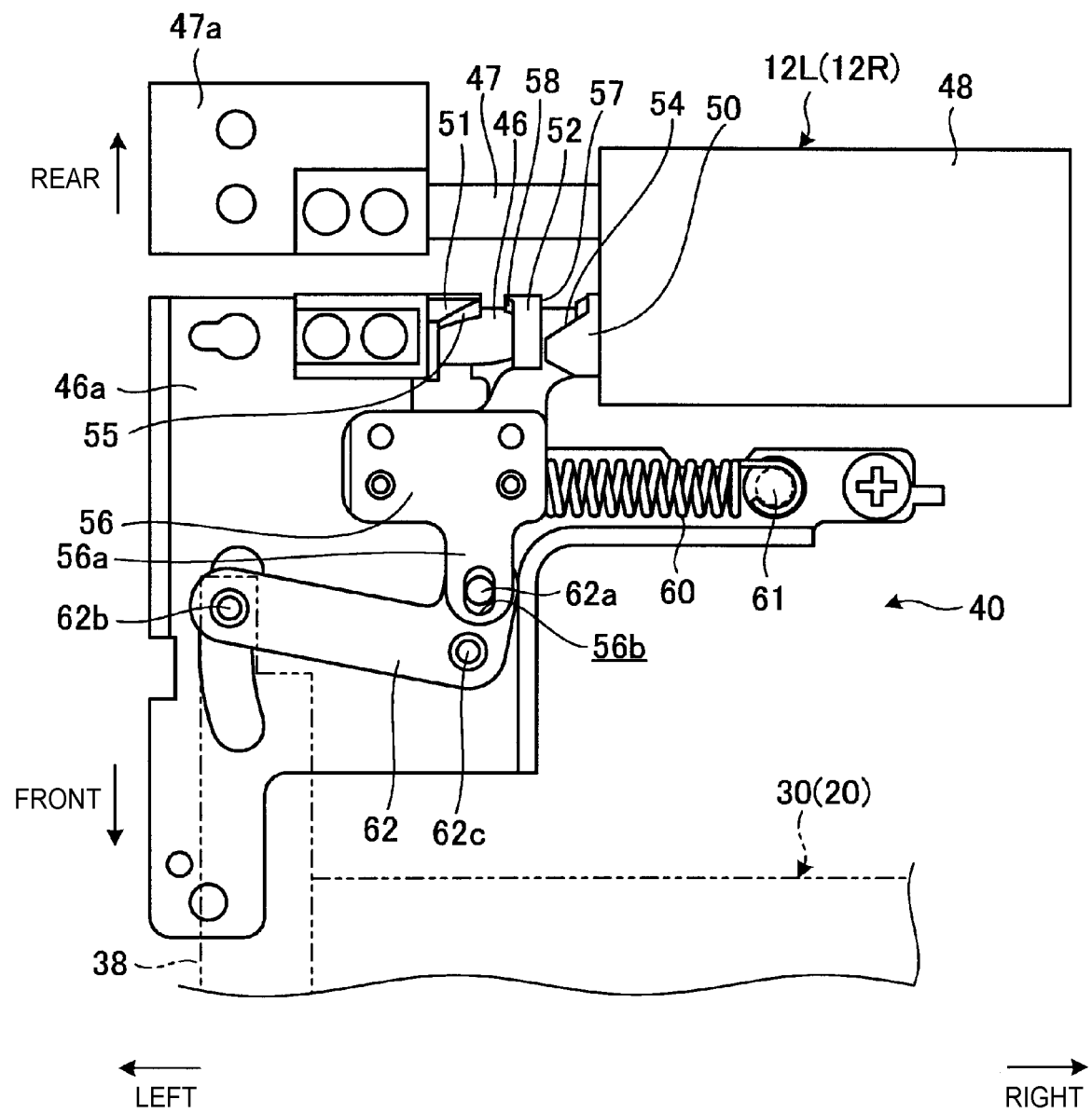
FIG. 5 is a plan view showing the hinge mechanism and the link mechanism.

FIG. 5 is a plan view of the hinge mechanism 12 and the link mechanism 40. The following describes the link mechanism 40 and a hinge mechanism 12 interlocking with this link mechanism 40 by way of an example of the hinge mechanism 12L on the left and the link mechanism 40 on the left as shown in FIG. 5. The hinge mechanism 12R on the right and the link mechanism 40 on the right interlocking with the hinge mechanism 12R have the same configuration as those on the left other than that they are bilaterally symmetrical, and so the detailed descriptions are omitted.

As shown in FIG. 5, the hinge mechanism 12 includes a first shaft 46 extending in the left-right direction, a second shaft 47 parallel to the first shaft 46, and a box-like hinge chassis 48 to rotatably support and house the first shaft 46 and the second shaft 47 (see also FIGS. 2A and 2B).

The first shaft 46 has one end fixed to a mounting plate 46a, and the mounting plate 46a is fixed to the main body chassis 16, whereby the first shaft 46 rotates integrally with the main body chassis 16. The second shaft 47 has one end fixed to a mounting plate 47a, and the mounting plate 47a is fixed to the display chassis 14, whereby the second shaft 47 rotates integrally with the display chassis 14. The other ends of the first shaft 46 and the second shaft 47 are supported rotatably in the hinge chassis 48. The first shaft 46 and the second shaft 47 of the present embodiment rotate synchronously via a not-illustrated gear train stored in the hinge chassis 48.

The first shaft 46 has a first cam 50 and a second cam 51 that are externally fitted to the outer periphery of the first shaft 46 at a part outside of the hinge chassis 48, and has a movable tube 52 also that is externally inserted between these cams 50 and 51. These cams 50 and 51 are disposed while having an interval so that the movable tube 52 moves between the cams. These cams 50 and 51 are fitted so that they are not rotatable around the first shaft 46. The movable tube 52 is externally inserted on the outer periphery of the first shaft 46 so as be rotatable and movable axially.

The first cam 50 has a first cam face 54 at an end face close to the movable tube 52. The first cam face 54 has an axial position that shifts along the circumferential direction. The second cam 51 has a second cam face 55 at an end face close to the movable tube 52. The second cam face 55 has an axial position that shifts along the circumferential direction.

The movable tube 52 is fixed to a slide link 56 that is supported movably in the left-right direction on the surface of the mounting plate 46a. The movable tube 52 has a first pressure-receiving face 57 and a second pressure-receiving face 58 at the right and left end faces, respectively. The first pressure-receiving face 57 and the second pressure-receiving face 58 have the axial positions that shift along the circumferential direction. The right lateral face of the slide link 56 retains one end of a coil spring 60. A pin 61 protrudes from the surface of the mounting plate 46a, and this pin 61 retains the other end of the coil spring 60. The coil spring 60 always biases the slide link 56 toward the direction of moving the movable tube 52 toward the first cam 50.

The slide link 56 has a coupling plate 56a that protrudes forward. The coupling plate 56a has a hole 56b, and a coupling pin 62a protruding from a swing link 62 is rotatably inserted into the hole 56b. The swing link 62 is a plate having an L-letter shape in plan view. The swing link 62 has the end of the short side of the L letter that rotatably connects to the slide link 56 via the coupling pin 62a, and the end of the long side of the L letter that rotatably connects to the rear end of the front/rear slider 38 via a link pin 62b. A part of the swing link 62 at the corner of the L letter is rotatably supported at the mounting plate 46a around a rotating shaft 62c.

Figure 6A:
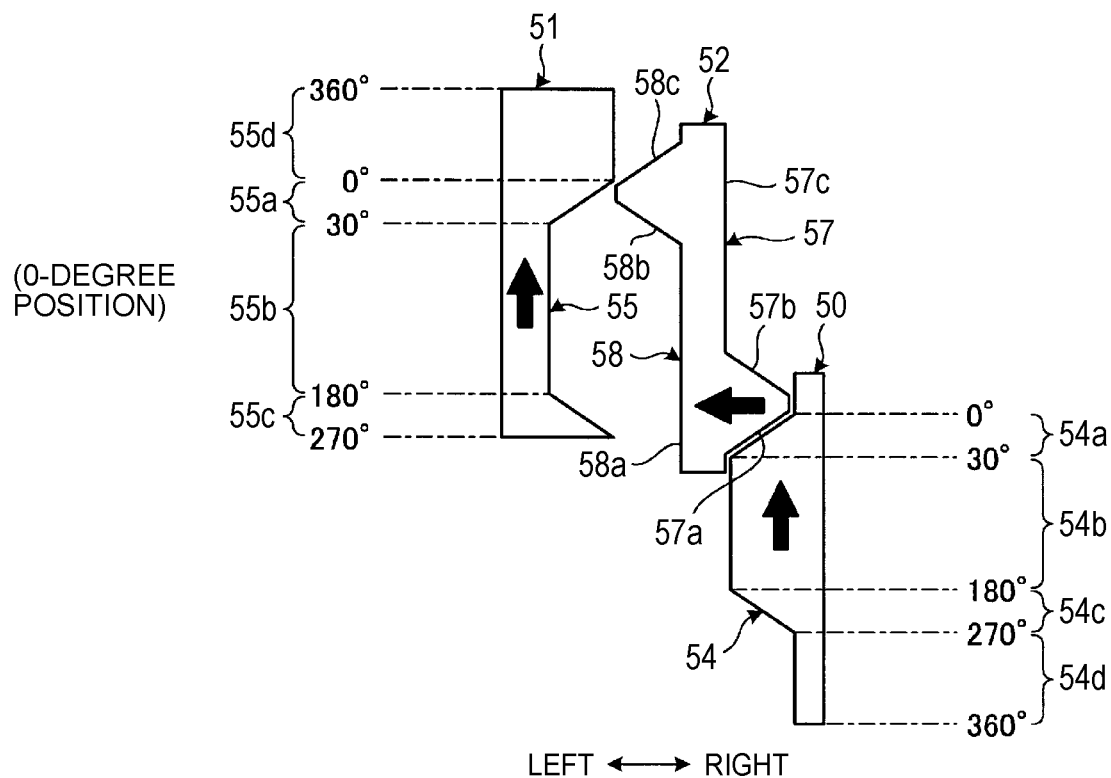
FIG. 6A shows the cams and the movable tube at the 0-degree position that are developed in the circumferential direction.
Figure 6B:
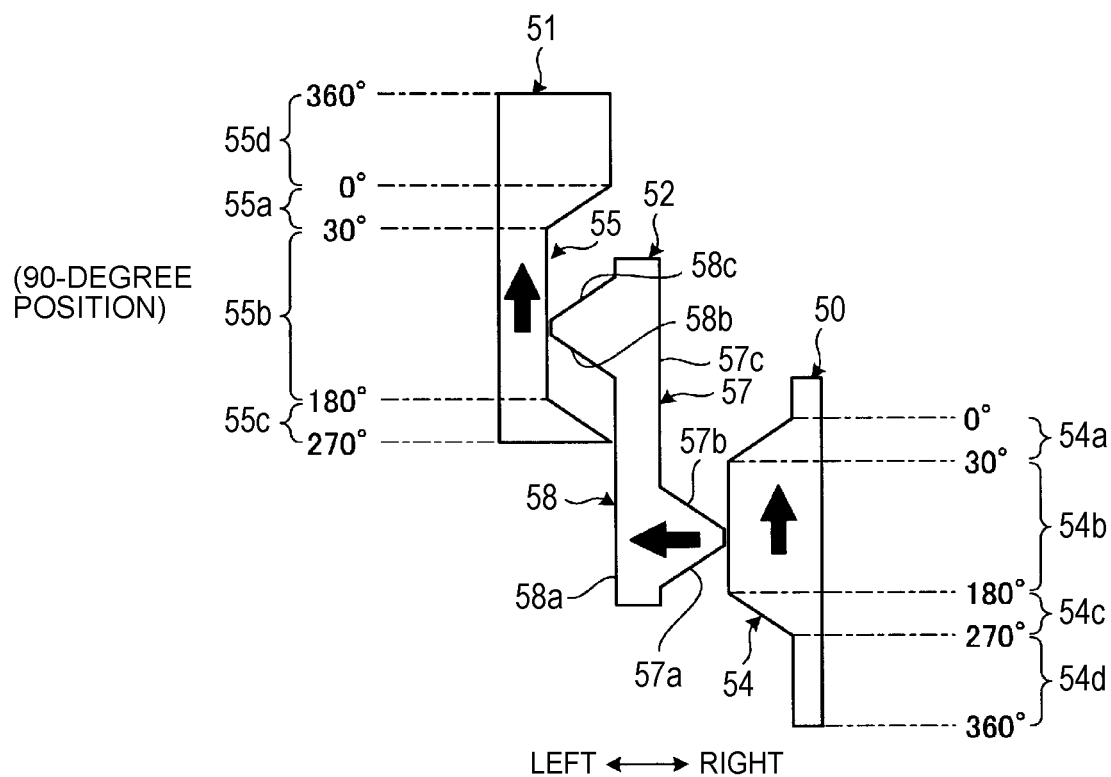
FIG. 6B shows the cams and the movable tube at the 90-degree position that are developed in the circumferential direction.

FIG. 6A and FIG. 6B are views showing the cams 50 and 51 and the movable tube 52 that are developed in the circumferential direction. FIG. 6A shows the positional relationship at the 0-degree position, and FIG. 6B shows the positional relationship at the 90-degree position. Arrows in FIG. 6A and FIG. 6B indicate the movement of the cams 50 and 51 and the movable tube 52 when the display chassis 14 rotates from the 0-degree position to the 360-degree position. When the display chassis 14 rotates from the 360-degree position to the 0-degree position, the cams 50 and 51 and the movable tube 52 move in the directions opposite of the arrows in FIG. 6A and FIG. 6B.

As shown in FIG. 6A and FIG. 6B, the first cam face 54 of the first cam 50 has a first working part 54a and a second working part 54c that axially (in the left-right direction) shift like a spiral along the circumferential direction, and a first idling part 54b and a second idling part 54d that extend along the circumferential direction. The second cam face 55 of the second cam 51 has a first working part 55a and a second working part 55c that axially (in the left-right direction) shift like a spiral along the circumferential direction, and a first idling part 55b and a second idling part 55d that extend along the circumferential direction.

The first pressure-receiving face 57 of the movable tube 52 has a first pressure-receiving part 57a and a second pressure-receiving part 57b that axially (in the left-right direction) shift like a spiral along the circumferential direction, and an idling part 57c that extends along the circumferential direction. The second pressure-receiving face 58 has an idling part 58a that extends along the circumferential direction and a first pressure-receiving part 58b and a second pressure-receiving part 58c that axially (in the left-right direction) shift like a spiral along the circumferential direction. The first pressure-receiving face 57 and the first cam face 54 are opposed so as to be in slidably contact, and the second pressure-receiving face 58 and the second cam face 55 are opposed so as to be in slidably contact.

Between the 0-degree position and the 30-degree position, the first pressure-receiving part 57a of the first pressure-receiving face 57 comes in slidably contact with the first working part 54a of the first cam face 54 (see FIG. 6A). This gradually moves the movable tube 52 to the left (toward the second cam face 55). Between the 30-degree position and the 180-degree position, the first idling part 54b comes in slidably contact with the top of the first pressure-receiving face between the first pressure-receiving part 57a and the second pressure-receiving part 57b (see FIG. 6B). The movable tube 52 therefore does not move. Between the 180-degree position and the 270-degree position, the second working part 54c comes in slidably contact with the top of the first pressure-receiving face between the first pressure-receiving part 57a and the second pressure-receiving part 57b. This gradually moves the movable tube 52 to the right (toward the first cam face 54). Between the 270-degree position and the 360-degree position, the second idling part 54d comes in slidably contact with the top of the first pressure-receiving face between the first pressure-receiving part 57a and the second pressure-receiving part 57b. The movable tube 52 therefore does not move.

Between the 0-degree position and the 30-degree position, the first working part 55a of the second cam face 55 comes in slidably contact with the second pressure-receiving part 58c of the second pressure-receiving face 58 (see FIG. 6A). This gradually moves the movable tube 52 to the left (toward the second cam face 55). Between the 30-degree position and the 180-degree position, the first idling part 55b comes in slidably contact with the top of the second pressure-receiving face between the first pressure-receiving part 58b and the second pressure-receiving part 58c (see FIG. 6B). The movable tube 52 therefore does not move. Between the 180-degree position and the 270-degree position, the second working part 55c comes in slidably contact with the first pressure-receiving part 58b. This gradually moves the movable tube 52 to the right (toward the first cam face 54). Between the 270-degree position and the 360-degree position, the second idling part 55d comes in slidably contact with the top of the second pressure-receiving face between the first pressure-receiving part 58b and the second pressure-receiving part 58c. The movable tube 52 therefore does not move.

That is, the link mechanism 40 interlinks with the rotation of the display chassis 14 relative to the main body chassis 16 via the hinge mechanism 12 so as to move the movable tube 52 to the left and right. This moves the slide link 56 to the left and right and swings the swing link 62. As a result, the front/rear slider 38 moves forward and rearward.

Next the following describes the operation of the key-position setting mechanism 28 during the rotation of the display chassis 14.

When the display chassis 14 is at the 0-degree position, the movable tube 52 (slide link 56) moves to a closest position to the first cam 50 (the rightmost position in FIG. 6A), and so the front/rear slider 38 moves to the frontmost position. The keyboard unit 20 then moves to the frontmost position as shown in FIG. 3B. The pressure-receiving parts 25*b* of the keycaps 25 therefore receive pressure from the corresponding pressing parts 26*c* of the frame 26 and are held at the pressed-down storage position. That is, the top faces 25*a* of the keycaps 25 are at a position flush with the top face 26*d* of the frame 26 or at a slightly lower position, so that the keyboard unit 20 has a flat top face. This avoids interference of the display chassis 14 closed relative to the main body chassis 16 with the keycaps 25 while making the electronic device 10 as thin as possible.

When the display chassis 14 rotates from the 0-degree position in the opening direction, the hinge chassis 48 of the hinge mechanism 12 also rotates. Then, the cam faces 54 and 55 of the cams 50 and 51 slide in contact with the pressure-receiving faces 57 and 58 of the movable tube 52.

When the display chassis 14 is between the 0-degree position and the 30-degree position, the movable tube 52 (slide link 56) gradually moves toward the second cam 51 (to the left in FIG. 6A), and so the front/rear slider 38 gradually moves rearward. Such rearward movement of the front/rear slider 38 moves the keyboard unit 20 also rearward. The keycaps 25 therefore move rearward relative to the frame 26 while sliding in contact with the pressing parts 26*c* at the pressure-receiving parts 25*b*, and then gradually move apart from the pressing parts 26*c*. As a result, the pressure-receiving parts 25*b* gradually move up along the pressing parts 26*c*, and so the keycaps 25 also move up due to the biasing force from the rubber domes 36.

When the display chassis 14 is at the 30-degree position, the movable tube 52 (slide link 56) moves to a closest position to the second cam 51 (the leftmost position in FIG. 6A), and so the front/rear slider 38 moves to the rearmost position. The keyboard unit 20 then moves to the rearmost position as shown in FIG. 3A. The pressure-receiving parts 25*b* of the keycaps 25 therefore are apart from the pressing parts 26*c* of the frame 26, and at the highest operating position. In this way, when the display chassis 14 of the electronic device 10 is open at the 30-degree position, the keycaps 25 are at the operating position that protrude upward from the top face 26*d* of the frame 26, and so the keyboard unit 20 is operable.

When the display chassis 14 is between the 30-degree position and the 180-degree position, the movable tube 52 (slide link 56) does not move in the left-right direction as shown in FIG. 6B. The position of the front/rear slider 38 also does not change, and so the keycaps 25 are kept at the operating position (see FIG. 3A). In this way, when the electronic device 10 has a 30 to 180-degree position where the electronic device will operate as laptop PC, the keyboard unit 20 is kept in the operable state.

When the display chassis 14 is between the 180-degree position and the 270-degree position, the movable tube 52 (slide link 56) gradually moves toward the first cam 50 (to the right in FIG. 6A) as clearly shown in FIG. 6A and FIG. 6B, and so the front/rear slider 38 gradually moves forward. The keyboard unit 20 also moves forward. The keycaps 25 therefore move forward relative to the frame 26 while sliding in contact with the pressing parts 26*c* at the pressure-receiving parts 25*b* and receiving pressure from the pressing parts 26*c*. As a result, the pressure-receiving parts 25*b* gradually move down along the pressing parts 26*c*, and so the keycaps 25 also move down against the biasing force from the rubber domes 36.

When the display chassis 14 is at the 270-degree position, the movable tube 52 (slide link 56) moves to a closest position to the first cam 50 (the rightmost position in FIG. 6A), and so the front/rear slider 38 moves to the frontmost position. Similarly to the 0-degree position, the keycaps 25 are held at the storage position as shown in FIG. 3B. That is, the top faces 25*a* of the keycaps 25 are at a position flush with the top face 26*d* of the frame 26 or at a slightly lower position, so that the keyboard unit 20 has a flat top face.

When the display chassis 14 is between the 270-degree position and the 360-degree position, the movable tube 52 (slide link 56) does not move in the left-right direction as clearly shown in FIG. 6A and FIG. 6B. The position of the front/rear slider 38 also does not change, and so the keycaps 25 are kept at the storage position (see FIG. 3B). The electronic device 10 therefore has a flat top face 16*a* of the main body chassis 16 that is the rear face of the tablet PC without an uneven shape of the keycaps 25. The keyboard unit 20 therefore does not interfere with the operation of the tablet PC.

When the display chassis 14 at the 360-degree position rotates in the closing direction, the operation will be in the direction opposite of the above-stated rotation in the opening direction. Specifically when the display chassis 14 rotates from the 360-degree position to the 180-degree position via the 270-degree position, the keycaps 25 gradually move up and return to the operating position at the 180-degree position.

The keycaps 25 are kept at the operating position from the 180-degree position to the 30-degree position. When the display chassis 14 rotates from the 30-degree position to the 0-degree position, the movable tube 52 (slide link 56) gradually moves to the first cam 50 (to the right in FIG. 6A), and so the front/rear slider 38 gradually moves forward. The keyboard unit 20 also moves forward, and so the keycaps 25 move forward relative to the frame 26, and slide in contact with the pressing parts 26*c* at the pressure-receiving parts 25*b* and receiving pressure from the pressing parts 26. As a result, the pressure-receiving parts 25*b* gradually move down along the pressing parts 26*c*, and so the keycaps 25 also move down against the biasing force from the rubber domes 36. At the 0-degree position, the keycaps 25 are held again at the storage position as shown in FIG. 3B. As a result, the keycaps 25 are at a position flush with the top face 26*d* of the frame 26 or at a slightly lower position, and so the display chassis 14 can be closed without interference of the display 18 with the keycaps 25.

Figure 7:
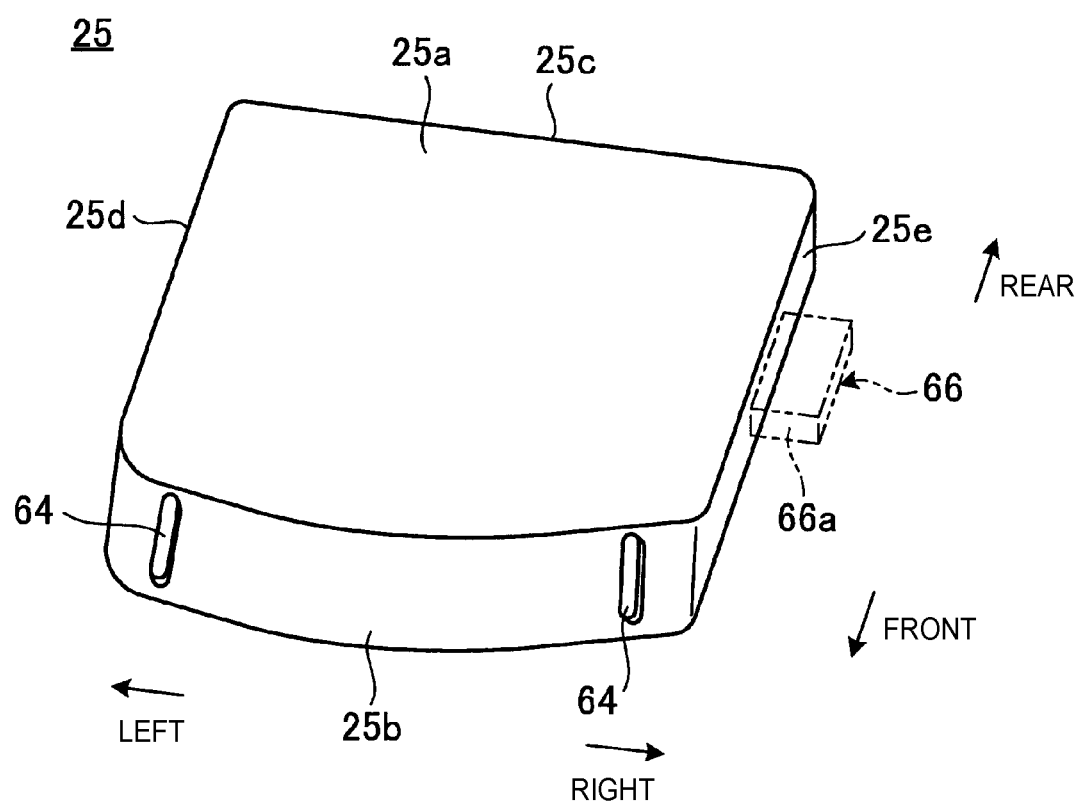
FIG. 7 is a perspective view of the keycap having a pressure-receiving part on each rib.

As shown in FIG. 7, each keycap 25 may have ribs 64 on the pressure-receiving part 25*b*. In the example of the key-position setting mechanism 28 in FIG. 3, the outer lateral face 25*b* on the front of each keycap 25 functions as the pressure-receiving part 25*b*. Repeated sliding of these pressure-receiving parts 25*b* against the pressing parts 26*c* may cause rubbing and wearing of the pressure-receiving parts 25*b* depending on the materials of these parts. To avoid this, as shown in FIG. 7, each pressure-receiving part 25*b* may have a pair of left and right ribs like protrusions extending in the sliding direction (front-rear direction) with the pressing part 26*c*, for example. With this configuration, the left and right ribs 64 on the pressure-receiving part 25*b* slide in contact with the pressing part 26*c*, and this can suppress rubbing and wearing of the pressure-receiving part 25b. Alternatively, each keycap 25 may be coated on the pressure-receiving part 25b, instead of the ribs 64, to suppress wearing of the pressure-receiving part 25b.

Figure 8:
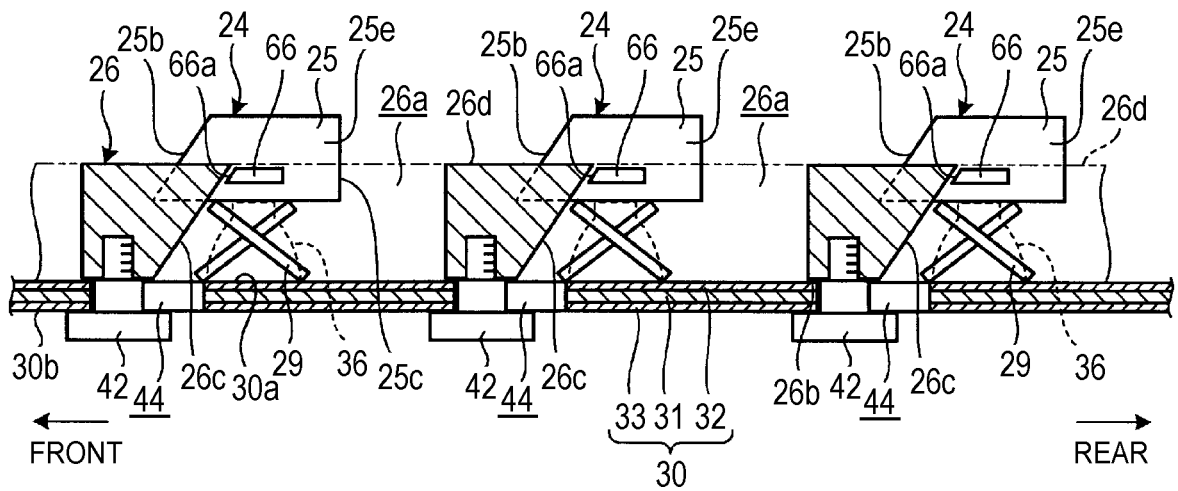
FIG. 8 is a cross-sectional view showing the keycaps, each having a pressure-receiving part as a tab on a lateral face.

As shown in FIG. 8, instead of the outer lateral face 25b on the front that functions as the pressure-receiving part 25b, each keycap 25 may have a tab 66 that is a piece of a plate on the outer lateral face 25e directed to the right, for example. Then, this tab 66 may have a pressure-receiving part 66a on the front face that is similar to the pressure-receiving part 25b. In this case, the frame 26 may have pressing parts 26c, and each pressing part 26c may be formed on the side of the outer lateral face 25e as one of the lateral faces of the keycap 25. With this configuration, when the keycaps 25 move forward and rearward relative to the frame 26, the pressure-receiving parts 66a slide in contact with the pressing parts 26c, so that the keycaps 25 move between the operating position and the storage position. Each tab 66 laterally protrudes from the keycap 25 and is covered with the frame 26. The tabs 66 therefore are not exposed in appearance of the keyboard unit 20. These tabs 66 and pressure-receiving parts 66a may be disposed on the outer lateral faces 25d directed to the left of the keycaps 25 or on both of the left and right outer lateral faces 25d and 25e.

Figure 9:
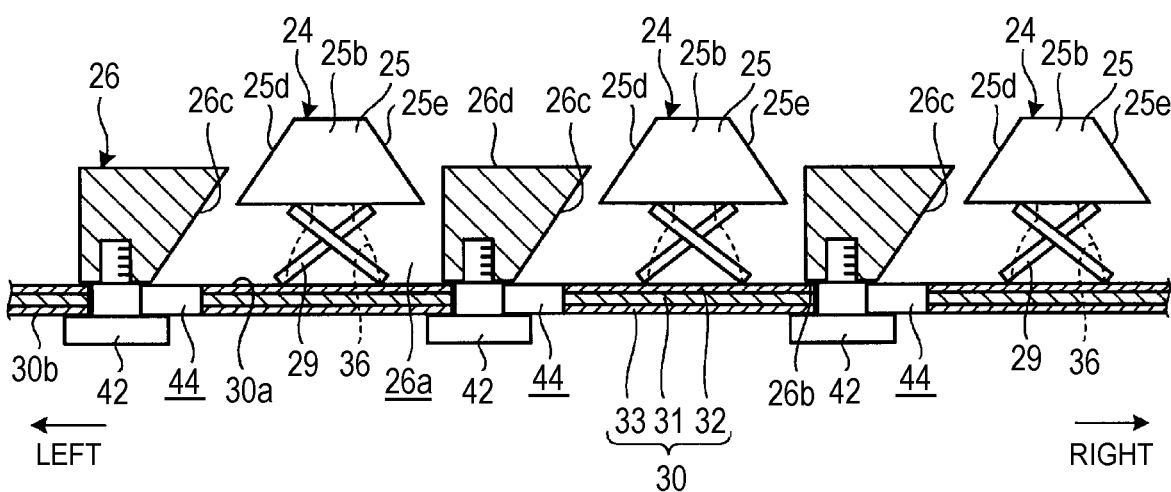
FIG. 9 is a cross-sectional view showing the keycaps, each having a pressure-receiving part on the left outer lateral face.

As shown in FIG. 9, instead of the outer lateral face 25b on the front that functions as the pressure-receiving part 25b, each keycap 25 may have the outer lateral face 25d directed to the left that functions as the pressure-receiving part 25d, for example. In this case, the support plate 30 of the keyboard unit 20 may have a configuration similar to a driving-direction conversion part 68 as shown in FIG. 10, for example, so that the movement of the front/rear slider 38 in the front-rear direction moves the support plate 30 of the keyboard unit 20 in the left-right direction. In this case, the frame 26 has pressing parts 26c, and each of the pressing parts 26c is formed at the left inner wall of the key insertion hole 26a that is opposed to the outer lateral face 25d of the corresponding to keycap 25. With this configuration, when the keycaps 25 move to the left and right relative to the frame 26, the pressure-receiving parts 25d slide in contact with the pressing parts 26c, so that the keycaps 25 move between the operating position and the storage position. The outer lateral face 25e directed to the right of each keycap 25 may function as the pressure-receiving part 25e. Such a configuration of moving the keyboard unit 20 in the left-right direction may include the tabs 66 and pressure-receiving parts 66a shown in FIG. 8 disposed on the front (rear) outer lateral face 25b (25c) of the keycap 25.

The electronic device 10 may include a stick-position setting mechanism 80 that moves the pointing stick 22 to a higher operating position and a lower storage position similarly to the keycaps 25.

Figure 10A:
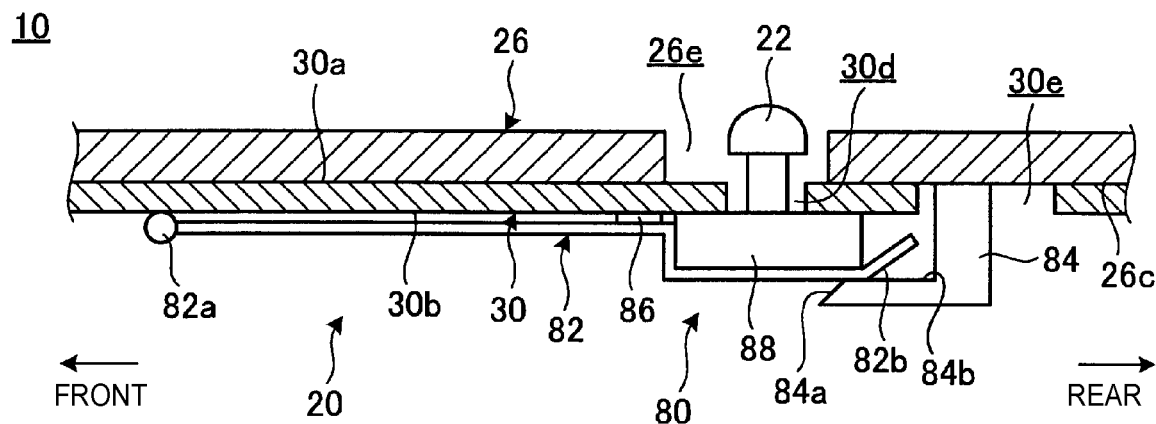
FIG. 10A is a schematic cross-sectional view showing a stick-position setting mechanism that moves a pointing stick up and down.
Figure 10B:
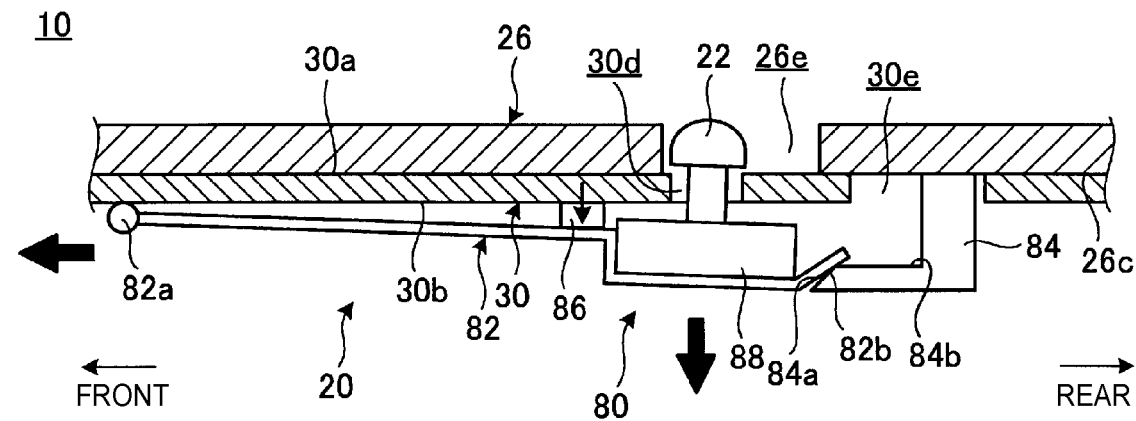
FIG. 10B is a cross-sectional view showing the pointing stick moved to the storage position from the position of FIG. 10A by the stick-position setting mechanism.

FIG. 10A is a schematic cross-sectional view showing the stick-position setting mechanism 80 that moves the pointing stick 22 up and down. This drawing schematically shows the positional relationship between the pointing stick 22 and the frame 26 when the pointing stick 22 is at the operating position. FIG. 10B is a schematic cross-sectional view showing the pointing stick 22 moved to the storage position from the position of FIG. 10A by the stick-position setting mechanism 80.

The stick-position setting mechanism 80 includes a support 82 and a limiter 84 disposed on the frame 26.

The support 82 moves up and down under the bottom face 30b of the support plate 30 between the lower position (see FIG. 10B) where the support moves down due to a biasing force from a blade spring (second elastic member) 86 and the upper position (see FIG. 10A) where the support moves up against the biasing force from the blade spring 86. The blade spring 86 intervenes between the support 82 and the bottom face 30b of the support plate 30, and always biases the support 82 so as to move the support downward. The support 82 connects to the support plate 30 at the front end via a rotary shaft 82a having a pivot-axis structure, and has a limiting inclined face 82b at the rear end. The limiting inclined face 82b is a rearward ascending inclined face that is inclined gradually upward from the front to the rear. The support 82 supports the pointing stick 22 via a supporting base 88 disposed on the top face in front of the limiting inclined face 82b. The pointing stick 22 is exposed on the top face of the keyboard unit 20 through an opening 30d of the support plate 30 and an opening 26e of the frame 26. The rotary shaft 82a may have another structure other than the pivot-axis structure. For example, the front end of the support 82 may rotatably engage with a hook-shaped part that protrudes downward from the base plate 31.

The limiter 84 is a substantially L-letter shaped plate that extends from the bottom face 26b of the frame 26 through an opening 30e of the support plate 30, and then bends forward. The limiter 84 has a forward descending inclined face (leading inclined face 84a) at the leading end that is inclined gradually downward from the rear to the front.

In such a stick-position setting mechanism 80, when the keycaps 25 are at the operating position as shown in FIG. 3A, the limiting inclined face 82b of the support 82 is held on the top face 84b of the limiter 84 of the frame 26 as shown in FIG. 10A. With this configuration, the pointing stick 22 is at the operating position, and protrudes from the top face of the keyboard unit 20. As a result, the keycaps 25 as well as the pointing stick 22 of the keyboard unit 20 are operable.

In the stick-position setting mechanism 80, when the keycaps 25 are at the storage position as shown in FIG. 3B, the keyboard unit 20 moves forward, and so the limiting inclined face 82b of the support 82 slides down in front of the limiter 84 as shown in FIG. 10B. With this configuration, the support 82 is at the lower position due to the biasing force from the blade spring 86, and so the pointing stick 22 is at the storage position and is embedded in the top face of the keyboard unit 20. In this way the keycaps 25 as well as the pointing stick 22 of the keyboard unit 20 are at the storage position, and so the chassis is made thinner.

When the keyboard unit 20 moves rearward again in response to the rotation of the display chassis 14, the limiting inclined face 82b overrides the leading inclined face 84a of the limiter 84. The pointing stick 22 therefore moves from the storage position of FIG. 10B and is held again at the operating position shown in FIG. 10A. In another configuration shown as in FIG. 9 where the keyboard unit 20 moves in the left-right direction, the support 82 and the limiter 84 also may be arranged along the left-right direction.

Figure 11:
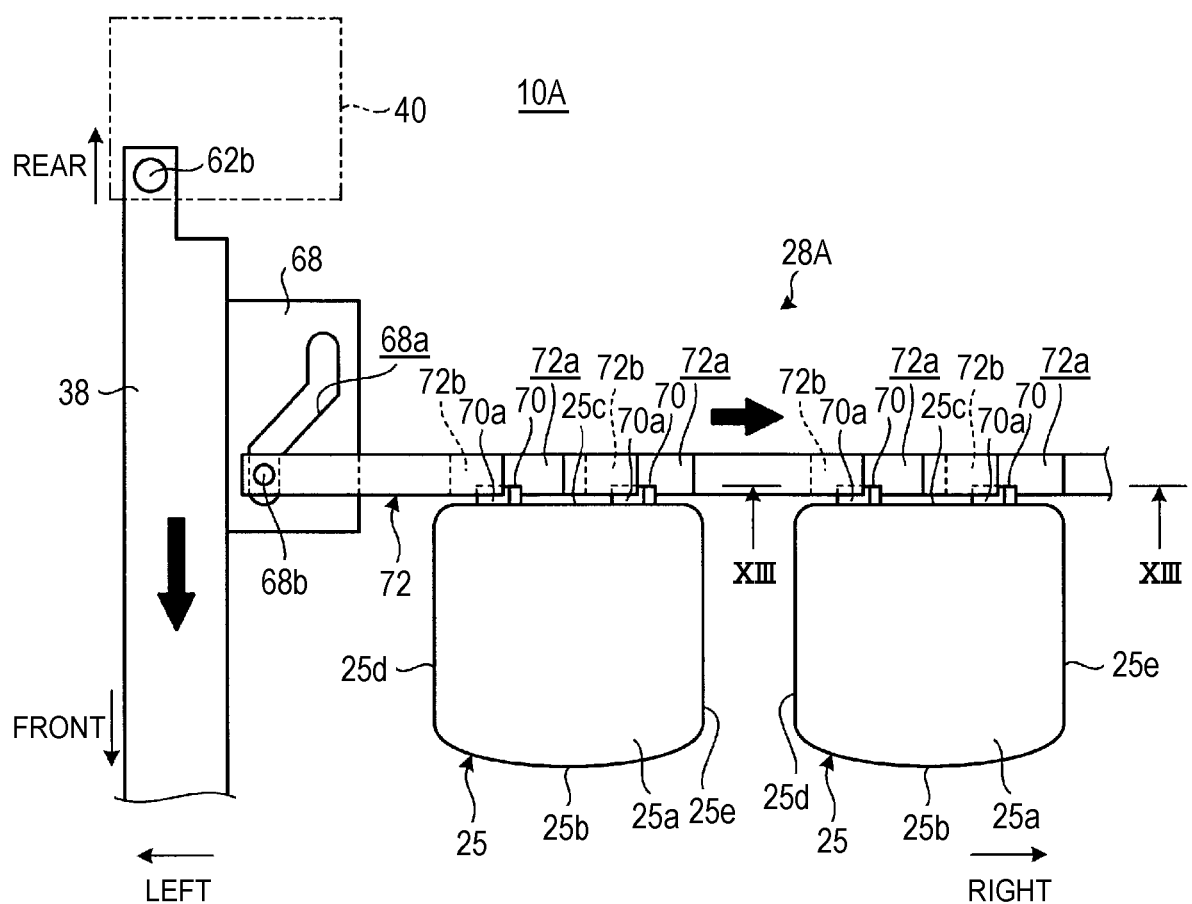
FIG. 11 is an enlarged plan view showing the major part of a key-position setting mechanism of an electronic device, according to a second embodiment.
Figure 12:
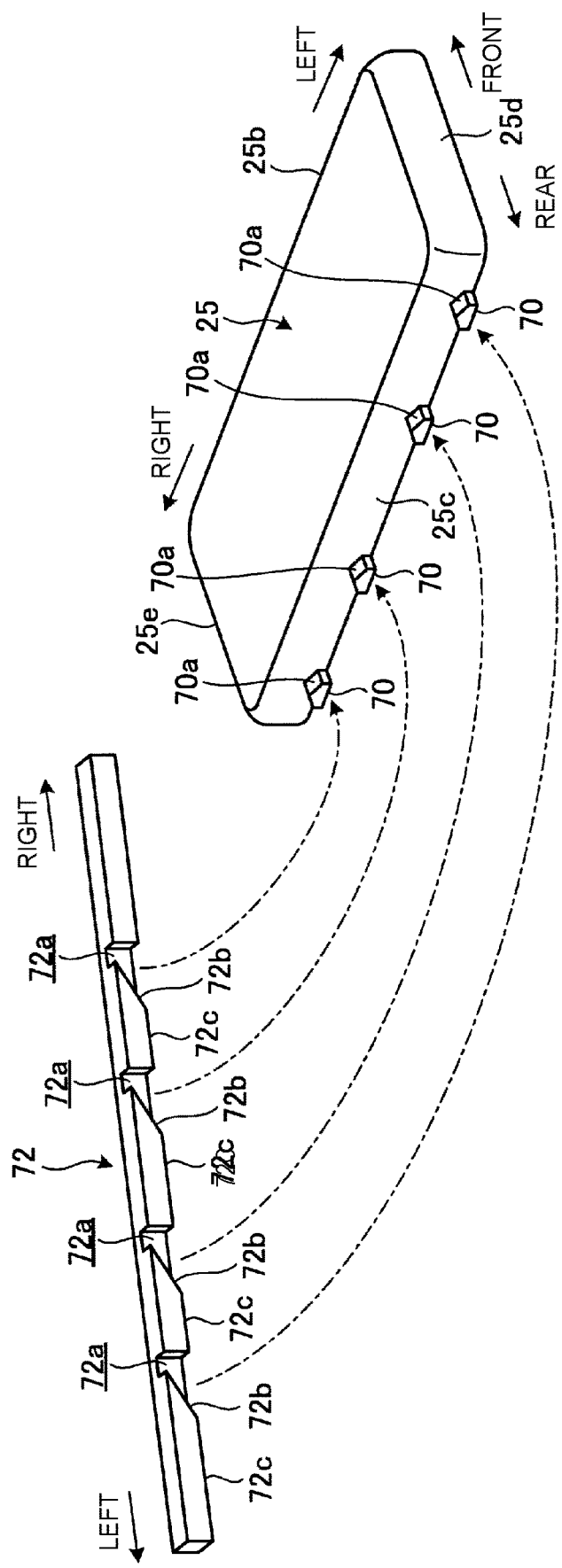
FIG. 12 is an exploded perspective view of the components of the key-position setting mechanism in FIG. 11.
Figure 13A:
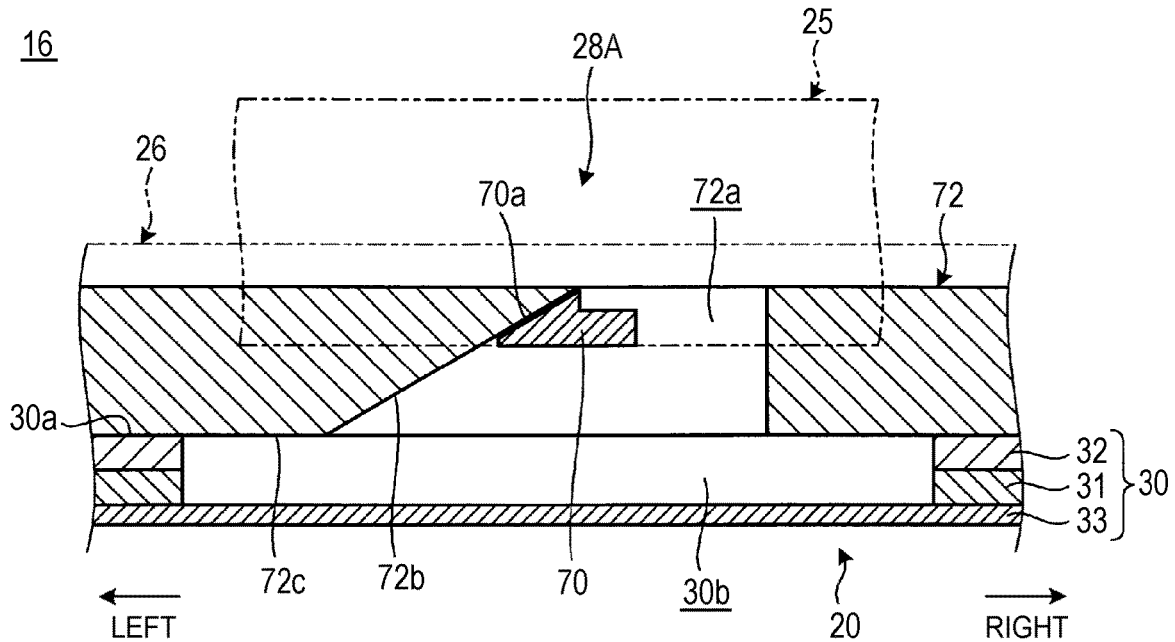
FIG. 13A is a cross-sectional view taken along the line XIII-XIII in FIG. 11 showing the keycaps at the operating position in the key-position setting mechanism of FIG. 11.
Figure 13B:
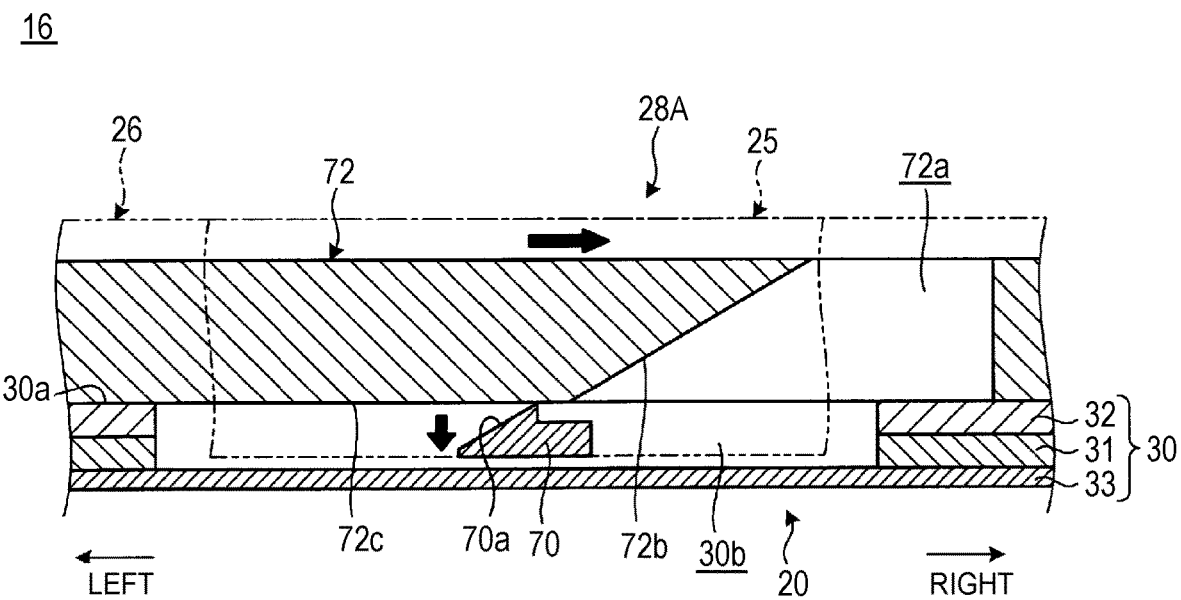
FIG. 13B is a cross-sectional view of the keycaps at the storage position moved from the position of FIG. 13A by the key-position setting mechanism.

FIG. 11 is an enlarged plan view showing the major part of a key-position setting mechanism 28A of an electronic device 10A according to a second embodiment. FIG. 12 is an exploded perspective view of the components of the key-position setting mechanism 28A in FIG. 11. FIG. 13A is a cross-sectional view taken along the line XIII-XIII in FIG. 11 showing the keycaps 25 at the operating position in the key-position setting mechanism 28A of FIG. 11. FIG. 13B is a cross-sectional view of the keycaps 25 at the storage position that is moved from the position of FIG. 13A by the key-position setting mechanism 28A. Like reference numerals indicate like parts having the same or similar functions and advantageous effects between the electronic device 10 according to the first embodiment as stated above and the electronic device 10A according to the second embodiment, and their detailed description is omitted. The same applies hereinafter.

As shown in FIG. 11 to FIG. 13B, the key-position setting mechanism 28A includes protrusions 70 on each of the keycaps 25, a left/right slider (driving member, slide member) 72, a front/rear slider 38, and a link mechanism 40.

One or a set of protrusions 70, which are arranged in the left-right direction, protrude from the rear outer lateral face 25c of each keycap 25. The keycaps 25 in FIG. 11 are alphabet keys, for example, and these keycaps 25 each have two protrusions 70. The keycap 25 in FIG. 12 is a long key in the left-right direction, such as a shift key, and this keycap 25 has four protrusions 70. Each protrusion 70 has a pressure-receiving part 70a on the left lateral face. This pressure-receiving part 70a is an inclined face that is inclined gradually downward from the right to the left.

The left/right slider 72 is a prismatic columnar member on the top face 30a of the support plate 30. The left/right slider 72 extends in the direction of arrangement of the keycaps 25 in the left-right direction. The left/right slider 72 is made of a resin material, such as POM, or a metal material, such as aluminum. The left/right slider 72 is supported on the top face 30a of the support plate 30 so as to be movable in the left-right direction, and hides under the bottom face of the frame 26. The left/right slider 72 has driving holes 72a at positions corresponding to the protrusions 70 of the keycaps 25. Each driving hole 72a has a pressing part 72b on the left inner wall, and the pressing part 72b is an inclined face that is inclined gradually upward from the left to the right. The left/right slider 72 has a holding face 72c that continues from the pressing part 72b of each driving hole 72a. The holding face 72c continues from the lowermost part of the pressing part 72b and extends to the left in parallel with the top face 30a of the support plate 30.

Each driving hole 72a receives the corresponding protrusion 70 of the keycap 25 that is inserted in a relatively movable manner. The pressing part 72b and the pressure-receiving part 70a inserted in the pressing part 72b are opposed. When the keycaps 25 are at the operating position, each pressure-receiving part 70a is located at the uppermost part of the pressing part 72b (see FIG. 13A). When the keycaps 25 are at the storage position, each pressure-receiving part 70a passes through the pressing part 72b and is located on the holding face 72c (see 13B).

The present embodiment includes a driving-direction conversion part 68 between the front/rear slider 38 and the left/right slider 72, and this driving-direction conversion part 68 is configured so that the movement of the front/rear slider 38 in the front-rear direction causes the movement of the left/right slider 72 in the left-right direction. In one example, the driving-direction conversion part 68 includes a guide hole 68a having a crank-like shape in a plate that protrudes from the front/rear slider 38, and a guide pin 68b protruding from the end of the left/right slider 72 and inserted into the guide hole 68a. The guide hole 68a is inclined gradually from the right to the left toward the front. The driving-direction conversion part 68 converts the movement of the front/rear slider 38 forward into the movement of the left/right slider 72 to the right due to the guiding action of the guide pin 68b along the guide hole 68a. The driving-direction conversion part 68 converts the movement of the front/rear slider 38 rearward into the movement of the left/right slider 72 to the left.

The keyboard unit 20 of this electronic device 10A is separated from the front/rear slider 38 and is fixed to the main body chassis 16. With this configuration of the electronic device 10A, when the display chassis 14 is at the 0-degree position, the left/right slider 72 moves to the rightmost position as shown in FIG. 13B. Each pressure-receiving part 70a of the keycap 25 therefore passes through the corresponding pressing part 72b of the left/right slider 72, and is held at the storage position located at the holding face 72c. That is, the top faces 25a of the keycaps 25 are at a position flush with the top face 26d of the frame 26 or at a slightly lower position, so that the keyboard unit 20 has a flat top face. This avoids interference of the display chassis 14 closed relative to the main body chassis 16 with the keycaps 25 while making the electronic device 10 as thin as possible. Additionally the left/right slider 72 does not have twisting load as in the rotary shaft member of the conventional technique as stated above, and so is made of a resin material as stated above. The left/right slider 72 can be easily made thinner. In this electronic device 10A, a part of each keycap 25 and the protrusion 70 are embedded in a recess 30c formed in the membrane sheet 32 and the base plate 31 of the support plate 30 (see FIG. 13B).

When the display chassis 14 rotates from the 0-degree position in the opening direction, the left/right slider 72 gradually moves to the left along with the movement of the front/rear slider 38 rearward between the 0-degree position and the 30-degree position. This moves each keycap 25 to the right relative to the left/right slider 72 while sliding in contact with the pressing part 72b at the pressure-receiving part 70a. As a result, the pressure-receiving part 70a gradually moves up along the pressing parts 72b, and so the keycap 25 also moves up due to the biasing force from the rubber dome 36.

When the display chassis 14 is at the 30-degree position, the front/rear slider 38 moves to the rearmost position. Each pressure-receiving part 70a of each keycap 25 therefore is located at the uppermost position of the pressing part 72b as shown in FIG. 13A, and so the keycaps 25 are at the highest operating position. In this way, the electronic device 10A also is configured so that, when the display chassis 14 is open at the 30-degree position, the keycaps 25 are at the operating position that protrude upward from the top face 26d of the frame 26, and so the keyboard unit 20 is operable.

The key-position setting mechanism 28A is configured so that the keycaps 25 operate similarly to the key-position setting mechanism 28 of the electronic device 10 as stated above between the 30-degree position and the 360-degree position. The detailed description on the operation therefore is omitted. Similarly to the key-position setting mechanism 28 of the electronic device 10 as stated above, also when the display chassis 14 at the 360-degree position rotates in the closed direction, the key-position setting mechanism 28A operates in the direction opposite of the rotation in the opening direction as stated above. Specifically when the display chassis 14 rotates from the 30-degree position to the 0-degree position, the front/rear slider 38 gradually moves forward, and the left/right slider 72 gradually moves to the right. Each pressure-receiving part 70a therefore slides in contact with the pressing part 72b while receiving pressure from the pressing part 72b. As a result, the pressure-receiving part 70a gradually moves down along the pressing part 72b, and so the keycap 25 also moves down against the biasing force from the rubber dome 36. At the 0-degree position, the keycaps 25 are held again at the storage position as shown in FIG. 13B.

Figure 14:
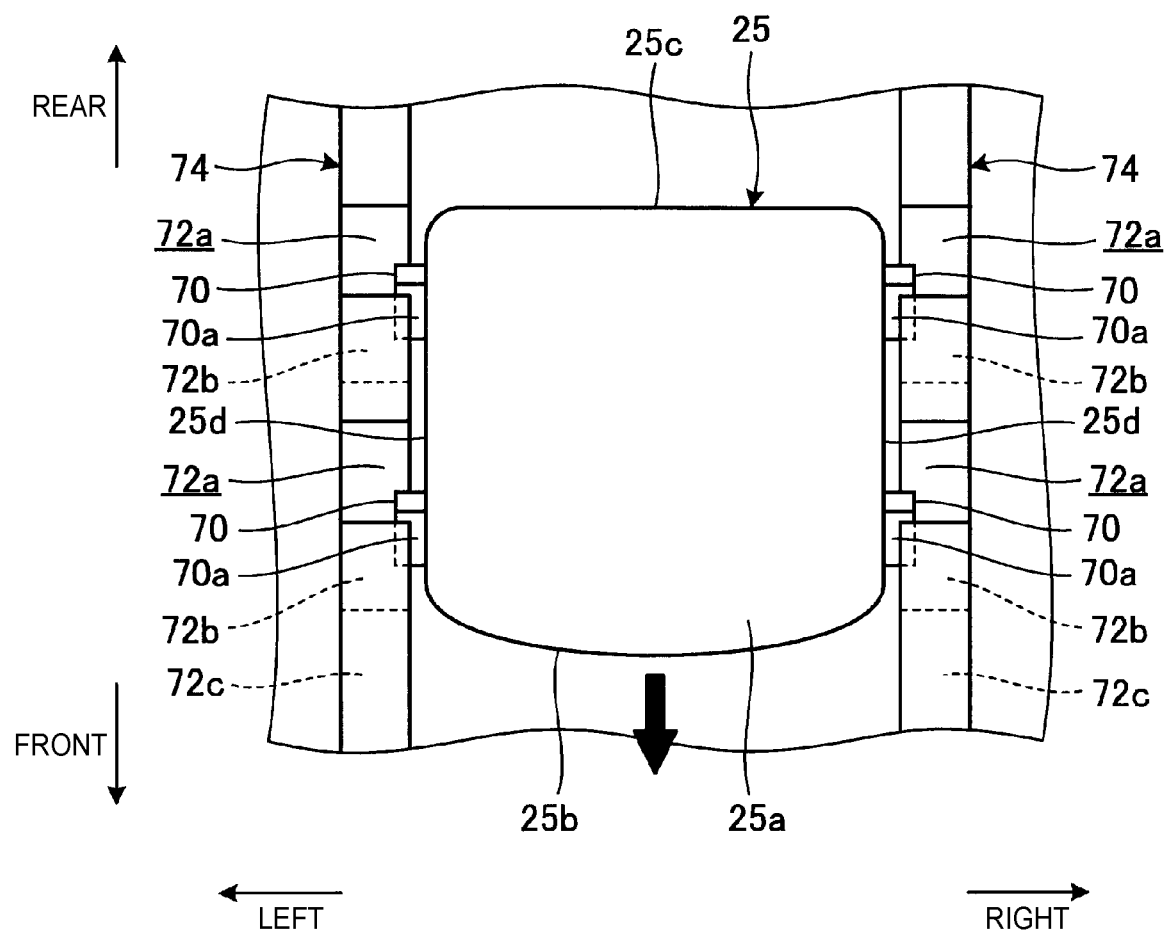
FIG. 14 is a plan view of a second front/rear slider instead of the left/right slider.

As shown in FIG. 14, the protrusions 70 may be disposed on one of the left and right outer lateral faces 25d and 25e or on both of the lateral faces instead of the rear outer lateral face 25c. In this case, the key-position setting mechanism 28A may include a second front/rear slider 74 instead of the left/right slider 72. The second front/rear slider 74 slides in the front-rear direction together with the front/rear slider 38 and extends on the left and right of each keycap 25 along the direction of front-rear arrangement of the keycaps 25. The second front/rear slider 74 may have a configuration similar to the configuration of the left/right slider 72 other than that the second front/rear slider 74 is arranged in the front-rear direction.

As stated above, the electronic device 10 (10A) according to the above embodiments includes: a support plate 30; a set of keycaps 25 supported above the top face 30a of the support plate 30, the keycaps 25 moving up and down between the operating position and the storage position; and a frame 26 (left/right slider 72) functioning as a driving member that is movable relative to the keycaps 25 in the direction parallel to the top face 30a of the support plate 30. Each keycap 25 has a pressure-receiving part 25b (25d, 25e, 66a, 70a) that is inclined gradually downward toward the frame 26 (left/right slider 72). The frame 26 (left/right slider 72) has a pressing part 26c (72b) that is inclined gradually upward toward the corresponding keycap 25 (72b). With this configuration, when the frame 26 (left/right slider 72) and the keycaps 25 move relatively toward each other, each pressing part 26c (72b) presses the corresponding pressure-receiving part 25b (25d, 25e, 66a, 70a), so that the keycap 25 move from the operating position to the storage position.

In this way, the electronic device 10 (10A), which includes the pressure-receiving parts 25b (25d, 25e, 66a, 70a) and the pressing parts 26c (72b) at the keycaps 25 and the frame 26 (left/right slider 72), respectively, can hold the keycaps 25 pressed downward at the storage position simply by relatively moving the keycaps 25 and the frame 26 (left/right slider 72) when the keyboard is not used. The electronic devices of these embodiment do not require a set of special components to press down the keycaps 25 as in the conventional technique as stated above. These electronic devices can store the keycaps 25 in the main body chassis 16 at low cost, and can have a thinner main body chassis 16. The above embodiments describe the configuration as an example including the pressure-receiving parts 25b (25d, 25e, 66a, 70a) and the pressing parts 26c (72b), both of which are inclined faces. In another embodiment, at least one of the pressure-receiving parts 25b (25d, 25e, 66a, 70a) and the pressing parts 26c (72b) may be an inclined face so as to press down the keycaps 25 to the storage position.

The above-stated electronic device 10 is configured so that the front/rear slider 38 directly moves the support plate 30 supporting the keycaps 25. The above-stated electronic device 10A is configured so that the driving-direction conversion part 68 converts the movement of the front/rear slider 38 in the front-rear direction into the movement of the left/right slider 72 in the left-right direction. The conventional technique as stated above includes a rotating shaft member that rotates with the movement of a front/rear slider 38 so as to move the pressing piece joined to this rotating shaft member up and down. As compared with the configuration of such a conventional technique, the electronic device 10, 10A transmits the amount of movement of the front/rear slider 38 to the movement of the keycaps 25 to their storage positions with smaller loss. As a result, a small amount of the movement of the front/rear slider 38 in the front-rear direction enables the movement of the keycaps 25 to their storage positions reliably. This reduces a load on the hinge mechanism 12. When the display chassis of the conventional electronic device is closed to the 0-degree position, the front/rear slider starts to move at about a 70-degree position. In contrast, the electronic device 10, 10A can reduce the amount of movement of the front/rear slider 38 in the front-rear direction, and so the front/rear slider 38 starts to move at about a 30-degree position when the display chassis 14 is closed to the 0-degree position as stated above. This leads to the convenience of the electronic device 10, 10A because, when the electronic device 10, 10A operates in a laptop mode, the keycaps 25 do not start to move downward when the display chassis 14 is closed to about a 50-degree position, for example.

As shown in FIG. 3B, the pressing part 26c of the electronic device 10 has a length in the sliding direction than that of the pressure-receiving part 25b. With this configuration, when the keycaps 25 moves to the storage position, the pressing part 26c has a sliding distance longer than that of the pressure-receiving part 25b. This can accommodate variations as tolerance of the moving distance if keyboard unit 20 moves beyond the setting value. Similarly the electronic device 10A has the holding face 72c that continues to the pressing part 72b as shown in FIG. 13B. This configuration can accommodate variations as tolerance of the moving distance if the left/right slider 72 moves beyond the setting value when the keycaps 25 move to the storage position.

As has been described, the present invention provides a slim electronic device capable of storing keycaps within a chassis when the electronic device operates without the keyboard in order to protect the keycaps.

The present invention is not limited to the above-described embodiments, and can be modified freely without deviating from the scope of the present invention.

In the above description as an example, when the display chassis 14 rotates to open from the 0-degree position, the front/rear slider 38 moves rearward, and when the display chassis 14 rotates to close from the 360-degree position, the front/rear slider 38 moves forward. This relationship between the rotating direction of the display chassis 14 and the moving direction of the front/rear slider 38 may be reversed. Specifically, when the display chassis 14 rotates to open, the front/rear slider 38 moves forward, and when the display chassis 14 rotates to close, the front/rear slider 38 moves rearward. In this case, the key-position setting mechanism 28 as stated above may be configured so that the rear outer lateral face 25c instead of the front outer lateral face 25b has a rearward descending pressure-receiving part 25c, and the pressing part 26c of the frame 26 is opposed to be slidable with this pressure-receiving part 25c. The key-position setting mechanism 28A and the stick-position setting mechanism 80 also may have similarly changed configurations.

In the above description as an example, the key-position setting mechanism 28 is configured so that the front/rear slider 38 moves the keyboard unit 20. In another embodiment, the front/rear slider 38 may move the frame 26 and the keyboard unit 20 may be fixed to the main body chassis 16.

The above-stated electronic device 10 has the stick-position setting mechanism 80 as well as the key-position setting mechanism 28. The electronic device in another embodiment may have the stick-position setting mechanism 80 only. The support 82 of the stick-position setting mechanism 80 as stated above moves up and down while rotating about the rotary shaft 82a. Another embodiment may have a mechanism (not shown) moving up and down so as to move the support 82 up and down. The stick-position setting mechanism 80 may be used for manipulating members other than the pointing stick 22, such as various push-buttons around the keyboard unit 20.

The above embodiment describes the example of the left/right slider 72 disposed along the rear lateral face of each keycap 25. In another embodiment, the left/right slider 72 may be disposed along the front lateral face. The left/right slider 72 may be integral with the frame 26. In this case, the front/rear slider 38 may move the frame 26, or similarly to the example of FIG. 3A and FIG. 3B, the keycaps 25 (keyboard unit 20) may move relative to this frame 26 (left/right slider 72).

The above-stated key-position setting mechanism 28, 28A and the stick-position setting mechanism 80 are configured to transmit the rotation of the hinge mechanism 12 to the front/rear slider 38 via the link mechanism 40. Another embodiment may be configured to include an actuator, such as an electric motor, instead of this mechanical link mechanism 40, so that the actuator is controlled in accordance with the rotation angle of the display chassis 14 around the hinge mechanism 12, for example. This actuator then may move the keyboard unit 20, the left/right slider 72, the frame 26 and the like via the front/rear slider 38 or not via the front/rear slider 38.

The above-stated electronic devices are configured so that when the display chassis is at the 0-degree position, the keycaps 25 are at the storage position, and when the display chassis is at the 30-degree position, the keycaps 25 are at the operating position. Such an angle to switch the positions of the keycaps 25 may be angles other than the 30-degree position.

While the invention has been particularly shown and described with reference to a preferred embodiment, it will be understood by those skilled in the art that various changes in form and detail may be made therein without departing from the spirit and scope of the invention.

What is claimed is:

1. An electronic device comprising:
   a support plate having a top face and a bottom face;
   a keyboard having a plurality of keycaps being supported on said top face of said support plate, wherein said plurality of keycaps are allowed to move between a first position where said keycaps move up due to a biasing force from an elastic member and a second position where said keycaps move down against said biasing force from said elastic member; and
   a driving member movable relative to said keycaps in a direction parallel to said top face of said support plate, wherein one of said keycaps has a pressure-receiving part, wherein said driving member includes pressing parts that move relative to said one keycap to come in contact with said pressure-receiving part, wherein said one pressure-receiving part and said pressing parts have an inclined face, and when said one pressure-receiving part and said pressing parts move relatively in a direction to come in contact with each other, pressing parts press said corresponding one pressure-receiving part via said inclined face in order to move said one keycap from said first position to said second position.

2. The electronic device of claim 1, wherein said driving member includes a frame for separating adjacent keycaps.

3. The electronic device of claim 2, wherein said frame has a plurality of key insertion holes for receiving said keycaps, wherein one of said key insertion holes includes an inner wall defining said pressing part having said inclined face.

4. The electronic device of claim 3, wherein said one keycap has an outer lateral face opposed to said corresponding pressing part of said frame, wherein said outer lateral face defines said pressure-receiving part having said inclined face.

5. The electronic device of claim 2, further comprising:
   a main body chassis containing said keyboard;
   a display chassis containing a display; and
   a link mechanism to allow a rotation of said display chassis relative to said main body chassis moves said support plate relative to said frame.

6. The electronic device of claim 1, wherein said driving member is a rod-like slide member disposed on said top face of said support plate, wherein said driving member extending in a direction of arrangement of said keycaps.

7. The electronic device of claim 6, wherein said pressure-receiving part includes a protrusion protruding from an outer lateral face of said one keycap.

8. The electronic device of claim 7, wherein said slide member has a driving hole as said pressing part at a position opposed to said protrusion of said one keycap to receive said protrusion so that said inserted protrusion is relatively movable.

9. The electronic device of claim 7, wherein said slide member has a holding face that continues from a lowermost part of said pressing part and extends in a direction parallel to said top face of said support plate.

10. The electronic device of claim 9, wherein when said slide member moves until said pressing part presses said corresponding pressure-receiving part and said one keycap move from said first position to said second position, wherein said holding face comes in contact with said pressure-receiving part to hold said keycaps at said second position.

11. The electronic device of claim 6, wherein said one keycap is arranged in lines in a front-rear direction and in a left-right direction.

12. The electronic device of claim 11, said slide member extends along one of a front lateral part and a rear lateral part of said one keycap arranged in said left-right direction, and a plurality of said slide members are disposed in lines in said front-rear direction.

13. The electronic device of claim 1, further comprising a support, having a top face, connected to said bottom face of said support plate, wherein said support being configured to move between a lower position where said support moves down due to a biasing force from a second elastic member and an upper position where said support moves up against said biasing force from said second elastic member.

14. The electronic device of claim 13, further comprising a pointing stick supported on said top face of said support, wherein said pointing stick being exposed on a surface of said keyboard through an opening of said support plate.

15. The electronic device of claim 14, wherein said driving member includes a limiter for holding said support at said upper position to limit movement of said support to said lower position, when said driving member and said one keycap moves relatively in a direction to be closer to each other, said limiter releases said support so that said support moves from said upper position to said lower position, and said pointing stick moves downward in said opening.

16. An electronic device comprising:
   a keyboard having a support plate, wherein said support plate includes a top face and a bottom face;
   a support having a top face and connected to said bottom face of said support plate, wherein said support is allowed to move between a lower position where said support moves down due to a biasing force from an elastic member and an upper position where said support moves up against said biasing force from said elastic member;

a manipulating member supported on said top face of said support, wherein said manipulating member is exposed on a surface of said keyboard through an opening of said support plate; and a driving member movable relative to said support plate in a direction parallel to said top face of said support plate, wherein said driving member includes a limiter for holding said support at said upper position to limit movement of said support to said lower position, and when said support is at said upper position and said driving member and said support plate move relatively, wherein said limiter releases said support so that said support moves from said upper position to said lower position, and said manipulating member moves downward in said opening.

17. The electronic device of claim 16, wherein said support has a rotary shaft that rotatably connects to said bottom face of said support plate at one end, and has a limiting inclined face that is inclined gradually upwards in a direction towards said limiter at said other end.

18. The electronic device of claim 17, wherein when said support is at said lower position and said driving member and said support plate move relatively, said limiting inclined face overrides said limiter, so that said support moves from said lower position to said upper position, and at the same time said limiter limits the movement of said support to said lower position.

19. The electronic device of claim 16, further comprising:
a main body chassis containing said keyboard and said manipulating member;
a display chassis containing a display; and
a link mechanism to allow a rotation of said display chassis relative to said main body chassis moves said support plate relative to said driving member, wherein said manipulating member includes a pointing stick to manipulate a cursor displayed on said display.

* * * * *